US012564206B2

(12) United States Patent
Diosady et al.

(10) Patent No.: US 12,564,206 B2
(45) Date of Patent: Mar. 3, 2026

(54) MULTI-SUPPLEMENT FOOD-ADDITIVE

(71) Applicant: THE GOVERNING COUNCIL OF THE UNIVERSITY OF TORONTO, Toronto (CA)

(72) Inventors: Levente Laszlo Diosady, North York (CA); Oluwasegun Modupe, Toronto (CA); Yao Li, Chino, CA (US)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 854 days.

(21) Appl. No.: 17/631,036

(22) PCT Filed: Jul. 20, 2020

(86) PCT No.: PCT/CA2020/051001
§ 371 (c)(1),
(2) Date: Jan. 28, 2022

(87) PCT Pub. No.: WO2021/022359
PCT Pub. Date: Feb. 11, 2021

(65) Prior Publication Data
US 2022/0264928 A1 Aug. 25, 2022

(30) Foreign Application Priority Data
Aug. 2, 2019 (GB) ...................................... 1911105

(51) Int. Cl.
*A23L 33/16* (2016.01)
*A23L 33/15* (2016.01)
(Continued)

(52) U.S. Cl.
CPC ............... *A23L 33/16* (2016.08); *A23L 33/15* (2016.08); *A23P 10/35* (2016.08); *A23P 20/105* (2016.08); *A23P 20/11* (2016.08)

(58) Field of Classification Search
CPC ........ A23L 33/15; A23L 33/16; A23P 20/105; A23P 20/11; A23P 10/35
See application file for complete search history.

(56) References Cited

U.S. PATENT DOCUMENTS 3,860,733 A 1/1975 Morse et al.
9,649,279 B2 5/2017 Jaklenec et al.
(Continued)

FOREIGN PATENT DOCUMENTS

CA 2238925 C 8/2007
TW M527766 U 9/2016
(Continued)

OTHER PUBLICATIONS

Combined Search and Examination Report Issued in priority GB Application No. GB1911105.3 on Feb. 4, 2020.
(Continued)

*Primary Examiner* — Jenna A Watts
(74) *Attorney, Agent, or Firm* — ABM INTELLECTUAL PROPERTY INC; Adrienne Bieber McNeil

(57) ABSTRACT

A fortified salt mixture includes sodium chloride salt grains and a multi-supplement food-additive admixed with the sodium chloride salt grains. The multi-supplement food additive includes particles, and each particle includes a core having a first supplement and a binder, a coating on the core, and a second supplement in the core and/or in the coating. A method for fortifying salt includes combining a first supplement, a second supplement, a binder and a coating to yield a multi-supplement food-additive; and admixing the multi-supplement food-additive with sodium chloride salt grains.

19 Claims, 17 Drawing Sheets

(51) Int. Cl.
  *A23P 10/35*        (2016.01)
  *A23P 20/10*        (2016.01)

(56)              References Cited

U.S. PATENT DOCUMENTS

| 2006/0251722 | A1  | 11/2006 | Bandak et al. | |
| 2007/0128272 | A1  | 6/2007  | Zerbe et al.  | |
| 2008/0003328 | A1* | 1/2008  | Benade        | A23L 33/40 |
|              |     |         |               | 426/72 |
| 2010/0303951 | A1* | 12/2010 | Sunvold       | A23K 50/42 |
|              |     |         |               | 426/2 |
| 2013/0316050 | A1  | 11/2013 | Lincoln et al. | |

FOREIGN PATENT DOCUMENTS

| WO | 2010069050 | A1 | 6/2010 |
| WO | 2013128474 | A1 | 9/2013 |
| WO | 2019186420 | A1 | 10/2019 |

OTHER PUBLICATIONS

Double fortification of salt with folic acid and iodine; Elisa June Teresa McGee, Angjalie Ruwanika Sangakkara, and Levente Laszlo Diosady; Journal of Food Engineering 198 (2017) 72-80.

Feasibility and optimization study of using cold-forming extrusion process for agglomerating and microencapsulating ferrous fumarate for salt double fortification with iodine and iron; Yao Olive Li, Divya Yadava, Kit Lan Lo, Levente L. Diosady and Annie S. Wesley; Journal of Microencapsulation, 2011; 28(7): 639-649.

High folate and low vitamin B-12 intakes during pregnancy are associated with small-for-gestational age infants in South Indian women: a prospective observational cohort study; Pratibha Dwarkanath, Julie R Barzilay, Tinku Thomas, Annamma Thomas, Swarnarekha Bhat, and Anura V Kurpad; Am J Clin Nutr 2013;98:1450-8.

International Search Report and Written Opinion of the International Searching Authority issued in parent PCT application No. PCT/CA2020/051001 on Sep. 28, 2020.

Technology for Triple Fortification of Salt with Folic Acid, Iron, and Iodine; Oluwasegun Modupe, Kiruba Krishnaswamy, and Levente L. Diosady; vol. 84, Iss. 9, 2019 Journal of Food Science.

The Fortification of Salt with Iodine, Iron, and Folic Acid; Elisa June Teresa McGee; A thesis submitted in conformity with the requirements for the degree of Master of Applied Science Department of Chemical Engineering and Applied Chemistry; University of Toronto; 2012.

The triple fortification of salt with iodine, iron, and folate using spray dried microcapsules; McGee E. and Diosady L.; XX International Conference on Bioencapsulation, Orillia, Canada, Sep. 23, 2012.

* cited by examiner

MULTI-SUPPLEMENT FOOD-ADDITIVE

CROSS-REFERENCES TO RELATED APPLICATIONS

This application is a national stage entry of international patent application no. PCT/CA2020/051001 filed on Jul. 20, 2020, which claims priority from and/or the benefit of United Kingdom patent application number 1911105.3 filed on Aug. 2, 2019, both of which are incorporated herein by reference in their entirety.

FIELD

This document relates to food-additives. More specifically, this document relates to multi-supplement food-additives, fortified salt mixtures containing multi-supplement food-additives, and methods for fortifying salt.

BACKGROUND

Applicant has previously attempted to develop folic acid and iodine spray solutions to investigate the stability of triple fortified salt containing iodine, folic acid and micro-encapsulated ferrous fumarate. The optimal spray solutions were buffered to pH 9 with a carbonate/bicarbonate buffer to stabilize folic acid and contained 1%-2% w/v folic acid and 1%-3% w/v iodine (as $KIO_3$). They remained in solution and retained ≥80% of both micronutrients after 5 months of storage at 25 degrees C. and 45 degrees C. Double fortified salt produced using these spray solutions retained 100% of both folic acid and iodine over a 5 month period when stored at ambient conditions. Unfortunately, triple fortified salt did not sufficiently retain the micronutrients due to excess moisture absorption and inadequate encapsulation of iron.

Other prior approaches for delivering supplementary micronutrients have involved the preparation of free-standing food products, for example tablets or bars containing a supplementary micronutrient. However, free-standing food products are prepared differently from and have different uses from food additives, and these prior approaches do not relate to the fortification of food ingredients (e.g. the fortification of salt). For example, in free-standing food products, each individual free-standing product unit (e.g. each tablet) is relatively large and typically provides a significant proportion of the recommended daily intake of a given micronutrient. In contrast, in food additives, a vast number (e.g. hundreds or thousands) of units—i.e. individual particles—can be required to provide a significant proportion of the recommended daily intake of a given micronutrient. Furthermore, in food additives, the product is admixed with a food ingredient to fortify the food ingredient, while remaining relatively undetectable in the food ingredient. In contrast, in free-standing food products, detectability is not a concern. Furthermore, while some of these prior approaches do involve the production of particles (particularly those in the pharmaceutical industry), these particles are then pressed into tablets, and are not suitable for and not intended as a food additive.

SUMMARY

The following summary is intended to introduce the reader to various aspects of the detailed description, but not to define or delimit any invention.

According to some aspects, a fortified salt mixture includes between 92.0 wt % and 99.9 wt % iodine-fortified sodium chloride salt grains. The iodine is present in the mixture at between 15 microgram/gram and 150 microgram/gram. The fortified salt mixture further includes between 0.1 wt % and 2.0 wt % of a multi-supplement food-additive admixed with the iodine-fortified sodium chloride salt grains. The multi-supplement food-additive includes particles, and the particles have a diameter of between 100 microns and 3000 microns. Each particle includes a core having an iron micronutrient, vitamin B12, vitamin B9, and a wheat-based binder. The iron micronutrient is present in the mixture at between 500 microgram/gram and 1500 microgram/gram, the vitamin B12 is present in the mixture at between 0.1 and 1.0 microgram/gram, and the vitamin B9 is present in the mixture at between 5 microgram/gram and 150 microgram/gram. A color-masking coating is on the core. An encapsulating coating is on the color-masking coating.

According to some aspects, a fortified salt mixture includes sodium chloride salt grains, and a multi-supplement food-additive admixed with the sodium chloride salt grains. The multi-supplement food additive includes particles, and each particle includes a core having a first supplement and a binder, a coating on the core, and a second supplement in the core and/or in the coating.

In some examples, the sodium chloride salt grains have a first particle size, the particles have a second particle size, and the second particle size matches the first particle size.

In some examples, the sodium chloride salt grains are iodine-fortified sodium chloride salt grains.

In some examples, the first supplement is a micronutrient, such as an iron micronutrient, a zinc micronutrient, or thiamine. In some examples, the first supplement is ferrous fumarate, ferrous sulphate, ferric sodium EDTA, ferrous gluconate, ferric chloride, electrolytic iron or ferric pyrophosphate.

In some examples, the second supplement is a micronutrient, a nutraceutical, or a pharmaceutical compound.

In some examples, the second supplement is water-soluble. In some such examples, the second supplement is vitamin B12, vitamin B1, vitamin B9, zinc, or vitamin C. In some such examples, the second supplement is in the core.

In some examples, the second supplement is water-insoluble. In some such examples, the second supplement is in the coating.

In some examples, the coating includes an encapsulating coating, and the second supplement is in the encapsulating coating. In some examples, the coating includes a color-masking coating on the core, and the second supplement is in the color-masking coating.

In some examples, the fortified salt mixture further includes a third supplement. In some such examples, the third supplement is on the sodium chloride salt grains. In other such examples the third supplement is in the particles, such as in the core or in the coating. In some such examples, the third supplement is a micronutrient, a nutraceutical, or a pharmaceutical compound. In some such examples, the third supplement is vitamin B12, vitamin B1, vitamin B9, or vitamin C.

In some examples, the binder includes a cereal-based binder. In some such examples, the binder includes semolina flour.

In some examples, the encapsulating coating includes a hard edible fat. In some such examples, the encapsulating coating includes soy stearin and/or hydroxypropyl methyl cellulose.

In some examples, the first micronutrient is present in the mixture at between 500 microgram/gram and 1500 microgram/gram, and the second micronutrient is present in the mixture at between 0.1 and 1.0 microgram/gram.

In some examples, the sodium chloride salt grains are present in the mixture at between 92.0 wt % and 99.9 wt %, and the multi-supplement food-additive is present in the mixture at between 0.1 wt % and 2.0 wt %.

According to some aspects, a multi-supplement food-additive includes particles having a diameter of between 100 microns and 3000 microns. The particles each have a core including an iron micronutrient, vitamin B12, vitamin B9, and a wheat-based binder; a color-masking coating on the core; and an encapsulating coating on the color-masking coating. The iron micronutrient is present in the particles at between 5 wt % and 20 wt %, the vitamin B12 is present in the particles at between 5 microgram/gram and 1000 microgram/gram, and the vitamin B9 is present in the particle at between 0.5 wt % and 10 wt %.

According to some aspects, a multi-supplement food-additive includes particles, wherein each particle has a core including a first supplement and a binder; a coating on the core; and a second supplement in the core and/or in the coating.

In some examples, the first supplement is a micronutrient. In some such examples, the first supplement is an iron micronutrient, a zinc micronutrient, or thiamine. In some such examples, the first supplement is ferrous fumarate, ferrous sulphate, ferric sodium EDTA, ferrous gluconate, ferric chloride, electrolytic iron or ferric pyrophosphate.

In some examples, the second supplement is a micronutrient, a nutraceutical, or a pharmaceutical compound.

In some examples, the second supplement is water-soluble. In some such examples, the second supplement is in the core. In some such examples, the second supplement is vitamin B12, vitamin B1, vitamin B9, zinc, or vitamin C.

In some examples, the second supplement is water-insoluble. In some such examples, the second supplement is in the coating. In some such examples, the coating includes an encapsulating coating, and the second supplement is in the encapsulating coating. In some such examples, the coating includes a color-masking on the core, and the second supplement is in the color-masking coating.

In some examples, the multi-supplement food-additive further includes a third supplement in the core and/or in the coating. In some such examples, the third supplement is a micronutrient, a nutraceutical, or a pharmaceutical compound. In some such examples, the third supplement is vitamin B12, vitamin B1, vitamin B9, or vitamin C.

In some examples, the binder includes a cereal-based binder such as semolina flour.

In some examples, the coating includes a hard edible fat, such as soy stearin. In some examples, the coating includes hydroxypropyl methyl cellulose.

In some examples, a mass ratio of the first supplement to the second supplement is between 10,000:1 and 20:1.

According to some aspects, a method for fortifying salt includes a. spraying sodium chloride salt particles with an iodine solution to yield iodine-fortified sodium chloride salt grains; b. co-extruding an iron micronutrient, vitamin B12, vitamin B9, and a wheat-based binder to create an extrudate; c. processing the extrudate to create core particles; d. coating the core particles with a color-masking coating to yield color-masked particles; e. coating the color-masked particles with an encapsulating coating to yield a multi-supplement food-additive; and f. admixing between 2.0 wt % and 0.10 wt % of the multi-supplement food-additive with between 92.0 wt % and 99.9 wt % of the iodine-fortified sodium chloride salt grains, to yield quadruple-fortified salt.

According to some aspects, a method for fortifying salt includes a. combining a first supplement, a second supplement, a binder and a coating to yield a multi-supplement food-additive; and b. admixing the multi-supplement food-additive with sodium chloride salt grains.

In some examples, the first supplement is an iron micronutrient, and the second supplement is a B vitamin. In some such examples, the first supplement is ferrous fumarate, and the second supplement is vitamin B12.

In some examples, in step a., the first supplement and second supplement are combined in a mass ratio of between 10,000:1 and 20:1.

In some examples, step a. includes: i. extruding a dough of the first supplement, the second supplement, and the binder, to yield an extrudate; ii. processing the extrudate to yield core particles; and iii. coating the core particles with the coating to yield the multi-supplement food-additive.

In some examples, step a. includes: i. extruding a dough of the first supplement and the binder, to yield an extrudate; ii. processing the extrudate to yield core particles; iii. combining the second supplement with a color-masking agent to yield a color-masking coating, and applying the color-masking coating to the core particles to yield color-masked particles; and iv. coating the color-masked particles with an encapsulating coating to yield the multi-supplement food-additive.

In some examples, step a. includes: i. extruding a dough of the first supplement and the binder, to yield an extrudate; ii. processing the extrudate to yield core particles; iii. combining the second supplement with an encapsulating coating to yield a fortified encapsulating coating; and iv. coating the core particles with the fortified encapsulating coating to yield the multi-supplement food-additive.

In some examples, the method further includes combining a third supplement with the first supplement, the second supplement, the binder and the coating to yield the multi-supplement food-additive. In some such examples, step a. includes i. extruding a dough of the first supplement, the second supplement, the third supplement, and the binder, to yield an extrudate; ii. processing the extrudate to yield core particles; and iii. coating the core particles with the coating to yield the multi-supplement food-additive. In some such examples, the third supplement is vitamin B9.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
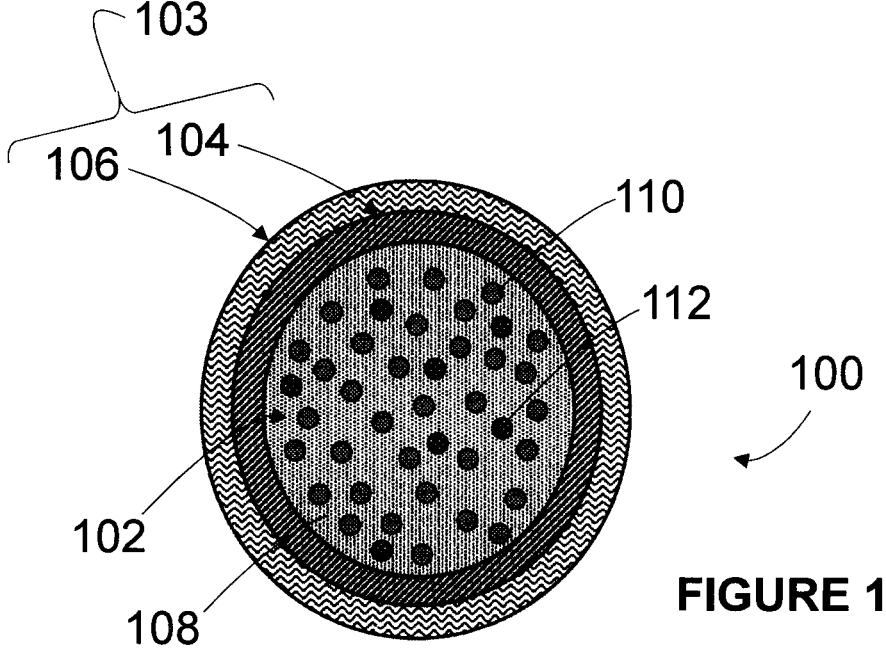
FIG. 1 is a schematic cross-sectional diagram showing an example particle of a multi-supplement food-additive.

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Generally disclosed herein are food-additives that include a plurality of supplements (also referred to herein as "multi-supplement food-additives"). For example, the multi-supplement food-additives can be in the form of particles that include a first supplement, a second supplement, and optionally a third or even further supplements. The first supplement can be, for example, an iron micronutrient (also referred to herein simply as "iron"), the second supplement can be, for example, vitamin B12 (also referred to herein simply as "B12"), and the third supplement can be, for example, vitamin B9 (also referred to herein as "folic acid", or simply as "B9"). The multi-supplement food-additives can be added to a food ingredient such as sodium chloride salt grains (also referred to herein simply as "salt"), particularly iodine-fortified sodium chloride salt grains (also referred to herein as "iodized salt"), to yield salt mixtures that are triple fortified, or further fortified (e.g. quadruple fortified). Alternatively, the multi-supplement food-additives (or salt fortified with the multi-supplement food-additives) can be added to a food ingredient such as bouillon cubes or soup mixes.

Surprisingly, it has been determined that known techniques used to fortify sodium chloride salt with iodine (i.e. spraying) are generally unsuitable for further fortifying iodized salt with vitamin B12, as the resulting product can be unstable and of an undesirable color. It has been determined that these problems can be ameliorated or overcome by incorporating the vitamin B12 into separate particles from the salt grains, and then admixing the separate particles to the salt grains. The resulting product is generally stable, and the separate particles can be generally undetectable in the mixture (i.e. they are generally white and tasteless, can have the same density as the salt particles, and can be sized to match the size of the salt particles).

In general, the multi-supplement food-additives disclosed herein can be in the form of particles, each of which has a core and a coating on the core. The core can include a first supplement (e.g. an iron micronutrient, a zinc micronutrient, or thiamine) and a binder (e.g. a wheat-based binder such as semolina flour). The coating can include an encapsulating coating (e.g. a coating of soy stearin and/or hydroxypropyl methylcellulose (HPMC) and/or lecithin) and optionally, a color-masking coating. A second supplement (e.g. vitamin B12, vitamin B1, vitamin B9, or vitamin C) can be in the core or in the coating (e.g. can be in the encapsulating coating, or in the color-masking coating). A third or a further supplement (e.g. vitamin B12, vitamin B1, vitamin B9, or vitamin C) can also be in the core or in the coating.

In general, the multi-supplement food-additives can be made by combining a first supplement, a second supplement, a binder, and a coating. The multi-supplement food additives can then be admixed with sodium chloride salt grains, particularly iodine-fortified sodium chloride salt grains.

As used herein, the term 'supplement' refers to any compound or substance that is required by the body for normal function, or that can benefit the body (e.g. by treating a condition or by improving health). For example, the term 'supplement' can refer to a micronutrient such as a vitamin (e.g. vitamin A, vitamin B1, vitamin B9, vitamin B12, or vitamin C), or a mineral or a metal (e.g. iron, magnesium, selenium, or zinc). For further example, the term 'supplement' can refer to a nutraceutical (defined below) such as lycopene or curcumin. For further example, the term 'supplement' can refer to a pharmaceutical compound.

As used herein, the term 'nutraceutical' refers to products that are purported to provide health benefits in addition to the basic nutritional value found in foods. Nutraceuticals include, for example, dietary fibre, probiotics, prebiotics, polyunsaturated fatty acids, polyphenols, herbs or botanical products as concentrates and extracts, compounds serving specific functions such as sports nutrition (e.g. pyruvate, chondroitin, sulphates, steroid hormone precursors), and weight-loss supplements.

As used herein, the term "iodine-fortified salt" (also referred to as "iodized salt") refers to sodium chloride salt that has been fortified with iodine, for example by spraying an iodine solution on the sodium chloride salt grains. Iodine-fortified salt can have an iodine content of, for example, between 15 microgram/gram and 150 microgram/gram.

Referring now to FIG. 1, a first example of a multi-supplement food-additive is shown. The multi-supplement food-additive is in the form of particles, one of which is shown in FIG. 1. In the example shown, the particle 100 includes a core 102, and a coating 103 on the core. The coating 103 includes a color-masking coating 104 on the core 102, and an encapsulating coating 106 on the color-masking coating 104.

In the example shown, the core 102 includes a binder 108, a first supplement 110, and a second supplement 112.

The binder 108 can be, for example, a cereal-based binder, or alginate. The cereal-based binder can be, for example, a wheat-based binder such as semolina flour or gluten; or maltodextrin.

The first supplement 110 can be, for example, a micronutrient, including an iron micronutrient such as ferrous fumarate, ferric pyrophosphate, ferrous sulphate, ferric sodium EDTA, ferrous gluconate, ferric chloride, electrolytic iron, ferrous lactate, ferrous tartrate, iron-sugar-carboxylate complexes, ferrous succinate, ferrous glutamate, ferrous citrate, ferrous cholinisocitrate, ferrous carbonate, and/or carbonyl iron; a zinc micronutrient such as zinc oxide, zinc sulphate, zinc chloride, or organic zinc compounds; thiamine; or another micronutrient that is recommended for consumption in relatively large quantities.

The second supplement 112 can be, for example, a water-soluble supplement, such as a water-soluble micronutrient, or a water-soluble nutraceutical, or a water-soluble pharmaceutical compound. Water-soluble micronutrients include vitamins such as vitamin B12, vitamin B1, vitamin B9, and vitamin C, and minerals or metals such as selenium, magnesium, zinc, and iron. Water-soluble nutraceuticals include lycopene or curcumin. Alternatively, the second supplement can be another supplement, such as another water-soluble supplement that is recommended for consumption in relatively small quantities with respect to the first supplement.

As mentioned above, the first supplement can be one that is recommended for consumption in relatively large quantities, and the second supplement can be one that is recommended for consumption in relatively small quantities. For example, the mass ratio of the first supplement to the second supplement can be, between 10,000:1 and 20:1. More specifically, in cases where the first supplement is an iron micronutrient and the second supplement is vitamin B12, the mass ratio of the first supplement to the second supplement can be, for example, 4000:1. In cases where the first supplement is an iron micronutrient and the second supplement is vitamin B9, the mass ratio of the first supplement to the second supplement can be, for example, 40:1.

In examples where the first supplement is an iron micronutrient, the iron micronutrient can be present in the food-additive at between 5 wt % and 20 wt %, or present in the fortified salt mixture at between 500 microgram/gram and 1500 microgram/gram; in examples where the first supplement is a zinc supplement, the zinc supplement can be present in the food-additive at between 5 wt % and 30 wt %; in examples where the first supplement is thiamine, the thiamine can be present in the food-additive at between 10 wt % and 75 wt %; in examples where the second supplement is vitamin B12, the vitamin B12 can be present in the food-additive at between 5 microgram/gram and 1000 microgram/gram, or present in the fortified salt mixture at between 0.1 microgram/gram and 1.0 microgram/gram; in examples where the second supplement (or third supplement, as described below) is vitamin B9, the vitamin B9 can be present in the food-additive at between 0.5 wt % and 10 wt %, or present fortified salt mixture at between 5 microgram/gram and 150 microgram/gram.

In some examples, the amounts of the various supplements in the particles can be selected based on the daily recommended amounts of a supplement for a given population, based on the average consumption of salt per day for that population, and based on the amount of the multi-supplement food-additive in the fortified salt mixture. More specifically, where the first supplement is ferrous fumarate, the amount of ferrous fumarate in the food-additive can be selected so that for a fortified salt mixture of 0.5 wt % food-additive and 99.5 wt % sodium chloride salt grains, the mixture contains about 1000 microgram/gram ferrous fumarate. For the population in India, which consumes on average 10 g of salt per day, this can provide 50% of the daily recommended amount of iron for an adult female. Similarly, where the second supplement is vitamin B12, the amount of vitamin B12 in the food-additive can be selected so that for a fortified salt mixture of 0.5 wt % multi-supplement food-additive and 99.5 wt % sodium chloride salt grains, the mixture contains about 0.25 microgram/gram vitamin B12, which can provide 100% of the daily recommended amount of B12 for an adult female. Similarly, where the second (or third) supplement is vitamin B9, the amount of vitamin B9 in the food-additive can be selected so that for a fortified salt mixture of 0.5 wt % multi-supplement food-additive and 99.5 wt % sodium chloride salt grains, the mixture contains between about 12.5 microgram/gram and 25 microgram/gram vitamin B9, which can provide between 50% and 100% of the daily recommended amount of vitamin B9 for an adult female.

The color-masking coating 104 on the core can be or can include, for example, zinc oxide or titanium dioxide. In some examples, the color-masking coating can act as an additional supplement in the particle (e.g. zinc oxide can be a color-masking agent as well as a zinc supplement).

The encapsulating coating 106 can be or include, for example, a hard edible fat (also referred to as a 'hard edible oil'), such as one having a melting point above 50 degrees C. For example, the encapsulating coating 106 can be or can include soy stearin and/or lecithin. For further example the encapsulating coating 106 can be or can include lecithin.

The particles 100 can be of various sizes, for example can have a diameter of between 100 microns and 3000 microns, more specifically between 200 microns and 2000 microns, more specifically between 300 microns and 1000 microns. The particle size can be selected based on the size of the food ingredient to which the particles 100 are to be added. For example, if the particles are to be added to iodized salt grains, which typically have a diameter of between 3 microns and 1000 microns, and more specifically of between about 400 microns and 600 microns, the particles can be sized to have a diameter of about between about 400 microns and 600 microns, to match the size of the iodized salt grains. In other words, the sodium chloride salt grains can have a first particle size (which refers to the average particle size in the mixture), and the particles of the multi-supplement food-additive can have a second particle size (which refers to the average particle size in the mixture), and the second particle size can match the first particle size. The phrase 'match' indicates that the first and second particle sizes are equal, or differ by at most 33%. Matching the size of the particles 100 to the size of the food ingredient to which the particles 100 are to be added can allow for the particles 100 to remain generally undetectable in the food ingredient.

In the example shown, the encapsulating coating 106 is indirectly on the core 102, i.e. the encapsulating coating 106 is on the color masking coating 104, which is in turn on the core 102. In alternative examples, the encapsulating coating can be directly on the core (e.g. in cases where the color masking coating is omitted).

Particles 100 in accordance with FIG. 1 can be made by making a dough of the first supplement 110, the second supplement 112, and the binder 108, and then extruding the dough to yield an extrudate (this step can also be described as "co-extruding" the first supplement 110, the second supplement 112, and the binder 108). The extrudate can then be processed to yield core particles, for example by drying, cutting, and spherulizing the extrudate. The core particles can then be coated with the color-masking coating 104. The color-masked particles can then be coated with the encapsulating coating 106, to yield the multi-supplement food-additive.

The multi-supplement food-additive can then be admixed with salt grains, particularly iodine-fortified sodium chloride salt grains, to yield triple fortified salt (TFS). For example, between 0.1 wt % and 2.0 wt % of the multi-supplement food-additive can be mixed with between 92.0 wt % and 99.9 wt % of iodine-fortified sodium chloride salt grains. More specifically, in some examples, about 0.5 wt % of the multi-supplement food-additive can be mixed with about 99.5 wt % of iodine-fortified sodium chloride salt grains. In other examples, the amount of iodine-fortified salt grains can be as low as 92 wt %, and the amount of multi-supplement food-additive can be as low as 0.5 wt %, with the remainder of the weight being made up by, for example, moisture and impurities.

Alternatively, in order to yield quadruple fortified salt (QFS), the multi-supplement food-additive can be admixed with sodium chloride salt grains that have been fortified with both iodine and an additional supplement. For example, sodium chloride salt grains can be fortified with both iodine and vitamin B9, by spraying the sodium chloride salt grains with an iodine solution as is known in the art, and also spraying the sodium chloride salt grains with a vitamin B9 solution using a similar spraying technique. Particles 100 in accordance with FIG. 1, for example including ferrous fumarate as the first supplement 110 and vitamin B12 as the second supplement 112, can then be admixed with the iodine- and vitamin B9-fortified sodium chloride salt grains, to yield quadruple fortified salt.

Figure 2:
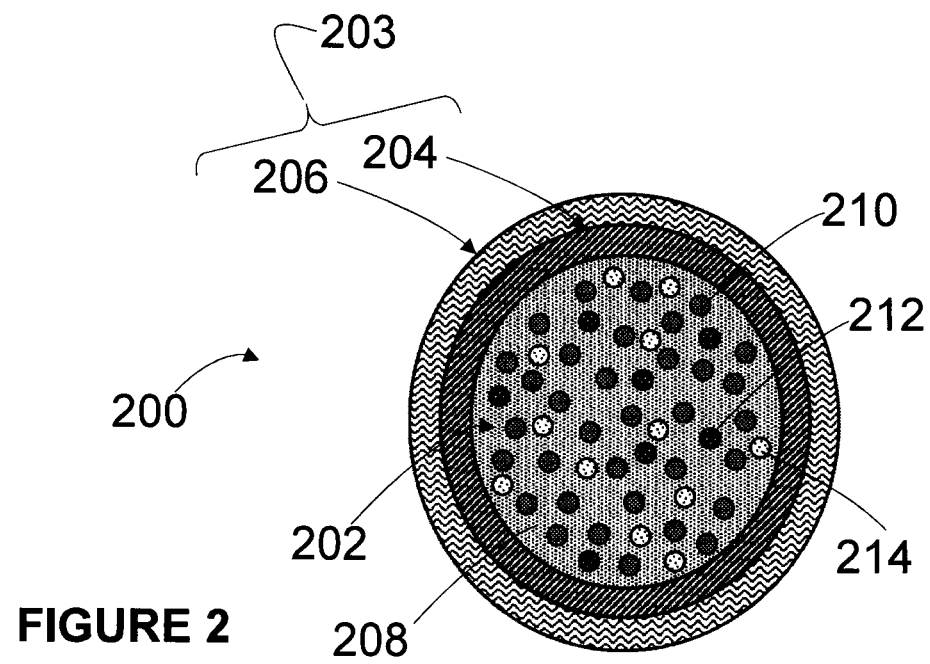
FIG. 2 is a schematic cross-sectional diagram showing another example particle of a multi-supplement food-additive.

Referring now to FIG. 2, another example of a multi-supplement food-additive is shown. The multi-supplement food-additive is in the form of particles 200, one of which is shown in FIG. 2. Similarly to FIG. 1, in the example shown, the particle 200 includes a core 202 and a coating 203 on the core 202. The coating 203 includes a color-masking coating 204 on the core 202, and an encapsulating coating 206 on the color-masking coating 204. However, in the particle 200 of FIG. 2, the core 202 includes a third supplement 214 in addition to the binder 208, first supplement 210, and second supplement 212.

The third supplement is different from the first supplement and second supplement and can be, for example, a water-soluble supplement, such as a water-soluble micronutrient, or a water-soluble nutraceutical, or a water-soluble pharmaceutical compound. As described above, water-soluble micronutrients include vitamins such as vitamin B12, vitamin B1, vitamin B9, and vitamin C, and minerals or metals such as selenium, magnesium, zinc, and iron. Water-soluble nutraceuticals include lycopene or curcumin. Alternatively, the third supplement can be another supplement, such as another water-soluble supplement that is recommended for consumption in relatively small quantities with respect to the first supplement. In one particular example, the first supplement is ferrous fumarate, the second supplement is vitamin B12, and the third supplement is vitamin B9.

Particles 200 in accordance with FIG. 2 can be made in a similar fashion to particles in accordance with FIG. 1. For example, a dough can be made of the first supplement 210, the second supplement 212, the third supplement 214, and the binder 208. The dough can be extruded to yield an extrudate. The extrudate can then be processed to yield core particles, for example by drying, cutting, and spherulizing the extrudate. The core particles can then be coated with the color-masking coating 204. The color-masked particles can then be coated with the encapsulating coating 206, to yield a multi-supplement food-additive.

In alternative examples (not shown), rather than including the second and/or third supplement in the core, the second and/or third supplement can be in the coating. For example, the second and/or third supplement can be coated on the core particle as a separate coating, combined with the color-masking agent to yield a fortified color-masking coating and then coated on the core particles, or combined with the encapsulating coating to yield a fortified encapsulating coating and then coated on the core particles. In some such examples, the second and/or third supplement can be a water-insoluble supplement, such as vitamin A, or supplement with low water-solubility, or a liposoluble supplement.

Figure 19:
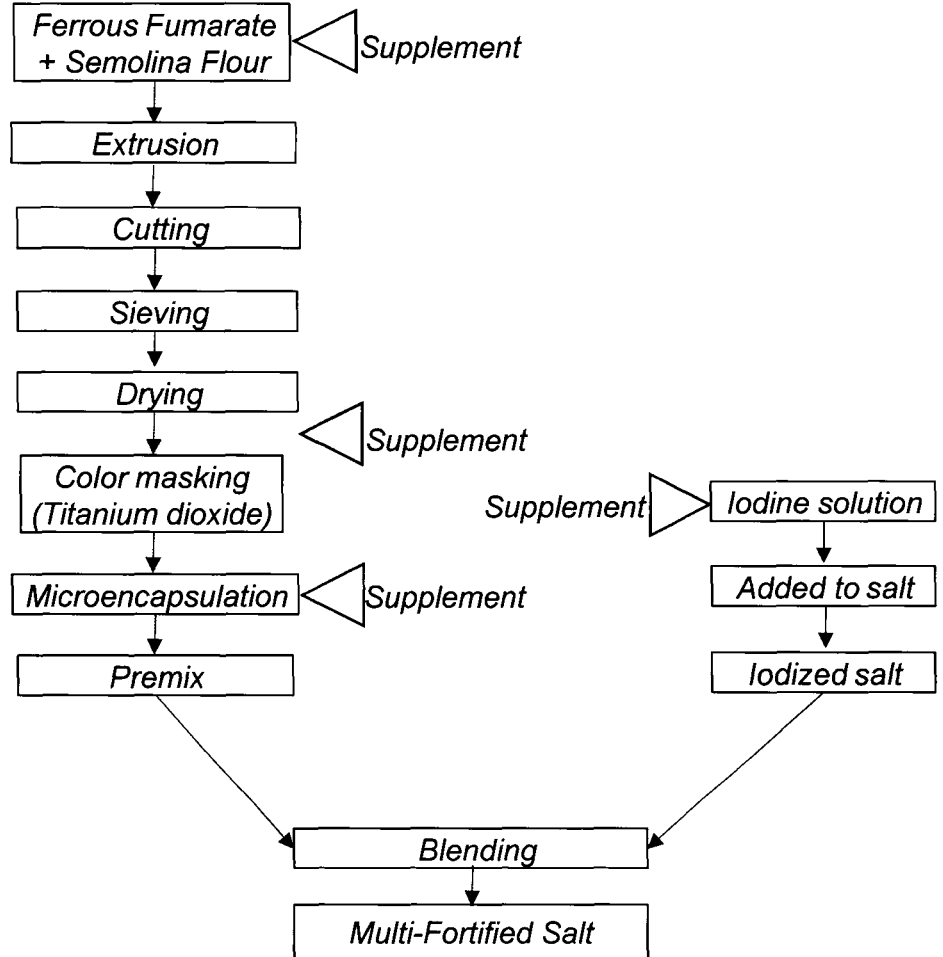
FIG. 19 is a flow diagram showing an example process for making a multi-supplement food-additive (premix), in which example points for incorporating supplements into the premix are indicated.

FIG. 19 shows an example flow diagram in accordance with the processes described above, in which the various points at which supplements can be added to the process are indicated.

While the above description provides examples of one or more processes or apparatuses or compositions, it will be appreciated that other processes or apparatuses or compositions may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

EXAMPLES

Throughout the Examples, the multi-supplement food additive is also referred to as a "premix" or as "premix particles".

Example 1

Materials:

Refined salt (~400 micron diameter) was obtained from Sifto (Canada) Corp. Folic acid, potassium iodate, sulfuric acid, sodium carbonate and potassium iodide, starch indicator, and semolina flour were obtained from Sigma-Aldrich (Canada), Bulk Pharm. Inc. (Canada), Caledon Lab Chem (Canada), Millipore Ltd (Canada), and Unico Inc. (Canada), respectively. Ferrous fumarate was obtained from Dr. Paul-Lohmann Chem, (Germany). Soy stearin, and iron fortificant (also referred to herein as iron premix) were obtained from JVS Food Pvt Ltd (India). Hydroxypropyl methyl cellulose (HPMC), Crisco Shortening (used as an extrusion lubricant) and titanium (IV) oxide were obtained from Dow Chem Company (USA), J. M. Smucker Co. (USA), and ACROS Organics (USA) respectively.

All chemicals used for the fortification of salt were food grade while those used for analysis were ACS grade.

Methods:

Formulation and Storage of Spray Solution: Seven sets of spray solutions were formulated, containing folic acid, vitamin B12, iodine, sodium ascorbate, sodium citrate and/or sodium carbonate, as described in Table 1. The stability of the solutions was monitored for 2 months at 25, 35, and 45 degrees C.

TABLE 1

Formulation Design for Spray Solution (*ND = Not Determined, 0.1M of $Na_2CO_3$ used only to adjust the pH or to make the solution).

| | | | | | Constituents | | |
|---|---|---|---|---|---|---|---|
| Spray Solution | Iodine (%) | Folic acid (%) | Vitamin $B_{12}$ (%) | Ascorbate (%) | Citrate (%) | Carbonate (%) | pH |
| 1 | 0 | 0 | 0.01 | 1.00 | 0 | 0 | 2.80 |
| 2 | 2.00 | 1.00 | 0.01 | 0 | 0 | 0.74 | 9.00 |
| 3 | 2.00 | 1.00 | 0 | 0 | 0 | 0.74 | 9.00 |
| 4 | 2.00 | 0 | 0.01 | 0 | 0 | 0 | 6.90 |
| 5 | 0 | 0 | 0.01 | 0 | 0 | 0 | 6.50 |
| 6 | 2.00 | 1.00 | 0.01 | 0 | 1.00 | ND | 9.00 |
| 7 | 2.00 | 1.00 | 0.01 | 0 | 0 | ND | 8.00 |

Figure 3:
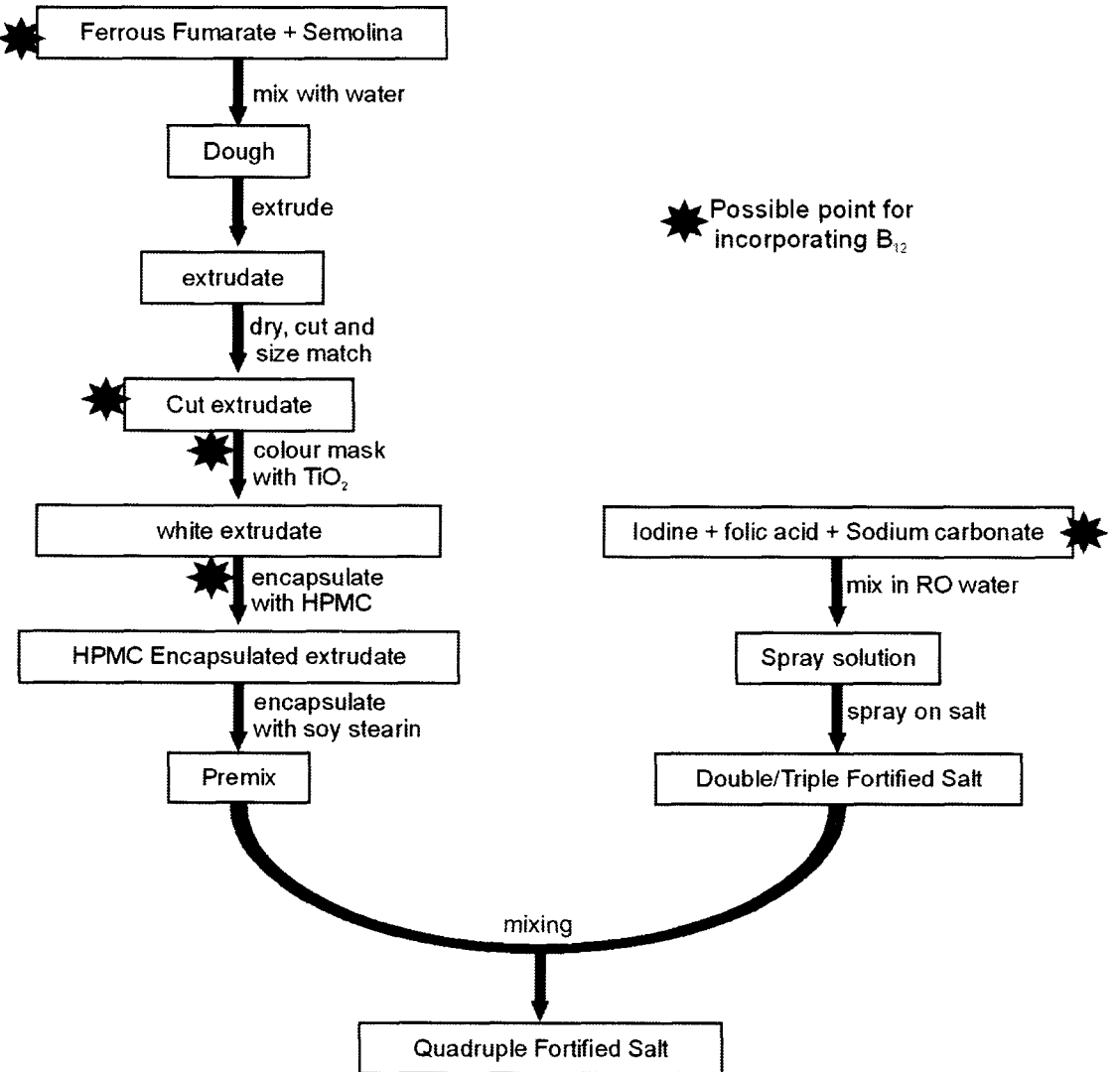
FIG. 3 is a flow diagram showing an example process for making quadruple fortified salt, in which example points for incorporating vitamin B12 into the salt are indicated.

Production of Iron-B12 Premix: Given the instability of vitamin B12 in the spray solutions (as described below with respect to FIG. 4), vitamin B12 was removed from the spray solutions and incorporated into separate particles with the iron micronutrient, as a multi-supplement food-additive, described above (also referred to herein as an 'iron-B12 premix'). For the iron-B12 premix, 25% $TiO_2$ was used for color masking, and 5% HPMC and 5% soy stearin as the encapsulating coating. As shown in FIG. 3, for the iron-B12 premix, four approaches were tested: vitamin B12 co-extruded with the iron micronutrient, vitamin B12 added to the iron micronutrient extrudate by spraying before color masking, vitamin B12 added to the colour masking agent, and vitamin B12 added to the HPMC (FIG. 3). The stability of vitamin B12 in each iron-B12 premix was evaluated for six months.

Formulation of Fortified Salt: Since vitamin B12 was not stable in the spray solution, the spray solution contained only folic acid and iodine (spray solution 3 in Table 1) for the purpose of making quadruple fortified salt. However, for comparative study, a solution containing folic acid, iodine and vitamin B12 (spray solution 2 in Table 1) was also used. The solutions (2.5 mL) were sprayed on salt (1 kg) inside a ribbon blender and thoroughly mixed for 20 minutes. The salt samples were dried overnight. The dried salt was returned to the ribbon blender and mixed with premix samples for 2 minutes. Iron premix (i.e. particles containing iron without any B12 or other fortificants) and three of the four iron-B12 premixes were used (adding B12 to $TiO_2$ was not further tested). Fortified salts containing different combinations of fortificants were formulated as shown in Table 2. The target concentrations of the fortificants were 1000 microgram/gram iron, 50 microgram/gram iodine, 25 microgram/gram folic acid and 0.25 microgram/gram vitamin B12.

TABLE 2

Formulation Design for Quadruple Fortified Salt (QFS) and Triple Fortified Salt (TFS)

| | Constituents (microgram/gram) | | | | |
|---|---|---|---|---|---|
| Salt Samples | Iron (Fe) | Folic Acid (FA) | Iodine | Vitamin $B_{12}$ | Source of Vitamin. $B_{12}$ |
| 1 "QFS Core" | 1000 | 25 | 50 | 0.25 | Fe & $B_{12}$ in premix; Fe & B12 coextruded |
| 2 "QFS Spray" | 1000 | 25 | 50 | 0.25 | Fe & $B_{12}$ in premix; B12 sprayed on iron extrudate |
| 3 "QFS HPMC" | 1000 | 25 | 50 | 0.25 | Fe & $B_{12}$ in premix; B12 combined with HPMC |
| 4 "QFS (B12 & FA not separated)" | 1000 | 25 | 50 | 0.25 | B12 sprayed with FA on Salt |
| 5 "TFS Core (No FA)" | 1000 | 0 | 50 | 0.25 | Fe & $B_{12}$ in premix; Fe & B12 coextruded |
| 6 "TFS Core (No I)" | 1000 | 25 | 0 | 0.25 | Fe & $B_{12}$ in premix; Fe & B12 coextruded |
| 7 "TFS HPMC (No FA)" | 1000 | 0 | 50 | 0.25 | Fe & $B_{12}$ in premix; B12 combined with HPMC |
| 8 TFS HPMC (No I)" | 1000 | 25 | 0 | 0.25 | Fe & $B_{12}$ in premix; B12 combined with HPMC |

The fortified salts were divided by solid sample splitter glassware into three portions. Each portion was stored at ambient conditions (25 degrees C.), 35 degrees C. and 60-70% RH, and 45 degrees C. and 60-70% RH. The stability of folic acid and iodine in the salt was monitored over a period of six months.

Folic Acid Analysis: For the spray solution, samples were diluted with 0.1 M $Na_2CO_3$ at ratio 1:1000 v/v and the absorbance of the resulting solution was read at 285 nm. For the salt samples, 5 g aliquots were dissolved in 0.1 M $Na_2CO_3$ (10 mL) in a falcon tube. The solution was mixed on a vortex mixer for 2 minutes and filtered with a 0.45 μm syringe filter. The absorbance of the filtrate was immediately read at 285 nm.

Iodine Analysis: Method 33.149, described by the Association of Official Analytical Chemists (AOAC), was used for iodine quantification in salt and spray solutions (Association of Official Analytical Chemists, 1984). In this method, iodate is reduced to iodine and titrated with sodium thiosulfate using a starch indicator.

Vitamin B12 Analysis: The iron-B12 premix was pulverized with a mortar and pestle. The pulverized premix (5 g) was weighed into 50 mL falcon tube, and 10 mL of RO water was added and mixed with a vortex mixer for 2 minutes. This was centrifuged for 2 minutes. The supernatant was filtered with a 0.45 micron filter. Vitamin B12 in the filtrate was quantified using UHPLC-MS.

Statistical Analysis: At least four replicates were used in all the experiments. The results are expressed as a mean±SD. The data was subjected to one-way ANOVA using SPSS Software and the differences between means were considered significant at $P<0.05$.

Results

Figure 4:
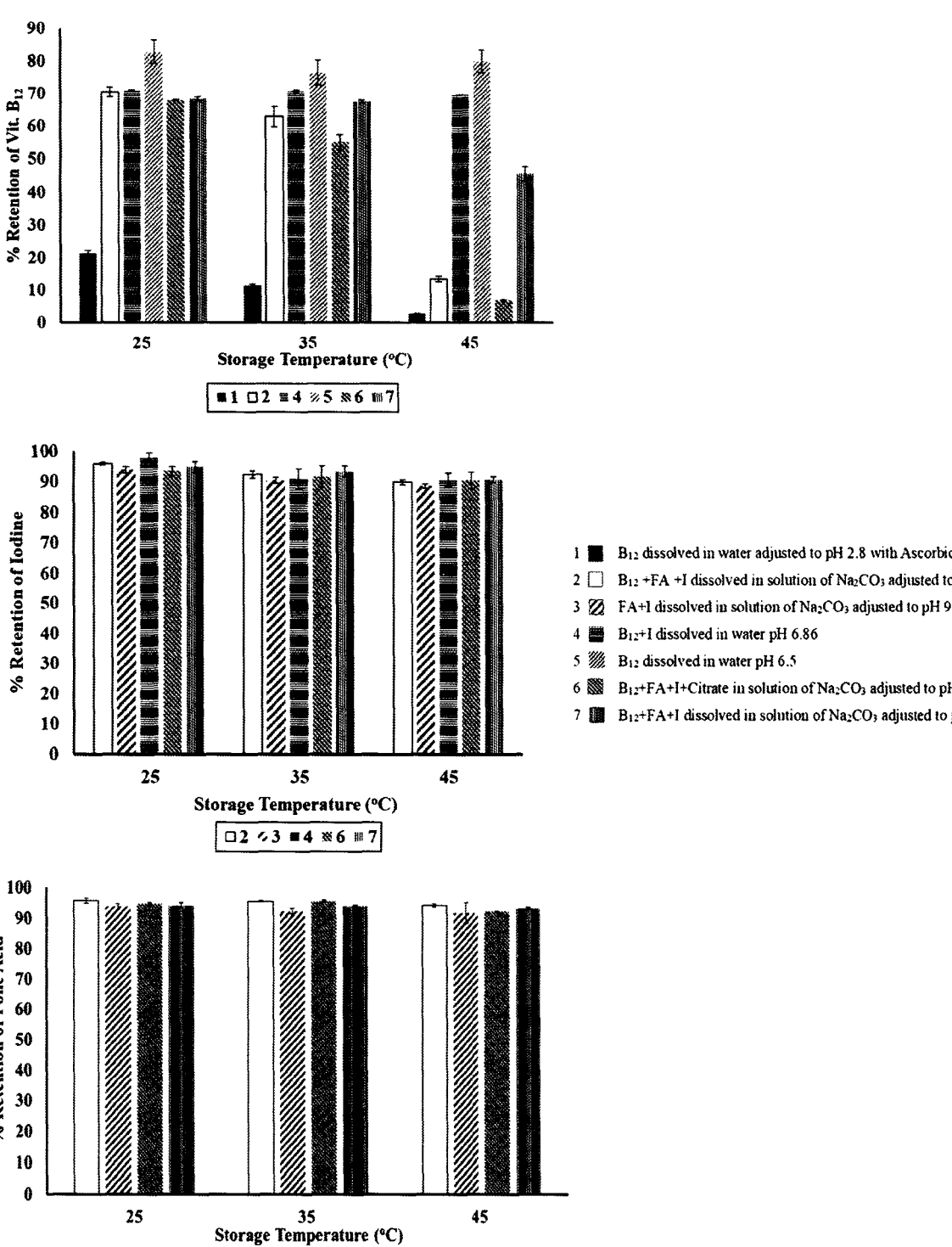
FIG. 4 is a series of plots showing the stability of iodine, folic acid and vitamin B12 in a solution-based system.

Attempts to deliver vitamin B12 in addition to iron, iodine, and folic acid by spraying iodine, folic acid and vitamin B12 on salt was not successful (FIG. 4). Almost 100% of the vitamin B12 in the spray solution (pH 9) was lost after 2 months of storage at 45 degrees C. and 70% RH. Even at a lower pH (8), more that 50% of the added vitamin B12 was still lost. Neither citrate nor ascorbic acid improved the stability of vitamin B12 in the solution. However, vitamin B12 was very stable in solutions that contained B12 and iodine without any pH adjustment. Folic acid and iodine were very stable in the solutions. Folic acid is sparingly soluble in water; it is more soluble and very stable in sodium carbonate solution at pH 8 and above, while vitamin B12 is very soluble in water. Hence, B12 was added to the folic acid solution system (pH 8 and 9). However, B12 is stable in slight acidic medium, which is believed to explain the incompatibility of folic acid and vitamin B12 in the solutions. The removal of either B12 or folic acid from the solution system was proposed to solve this problem. Since 1) B12 was relatively less stable than folic acid in solutions that contained B12 and iodine only, and folic acid and iodine only, and 2) B12 was observed to render the salt particles pink, B12 was selected for removal from the spray solution.

Vitamin B12 was incorporated into a separate particle with iron, to yield a multi-supplement food-additive, also referred to herein as an iron-B12 premix. There were four approaches to creating the iron-B12 premix, as described above with reference to FIG. 3: coextrusion of vitamin B12 with iron, spraying of vitamin B12 on the iron extrudate before colour masking, addition of vitamin B12 to the colour masking agent, and addition of vitamin B12 to the encapsulating coating (i.e. HPMC in this case). Each of these approaches was successful; however, the co-extrusion of vitamin B12 and iron may be preferred as it requires minimal additional water and may obviate an additional drying step, as it yields a particle that is white (as opposed to pink), and as it minimizes loss of vitamin B12 during coating.

Figure 5:
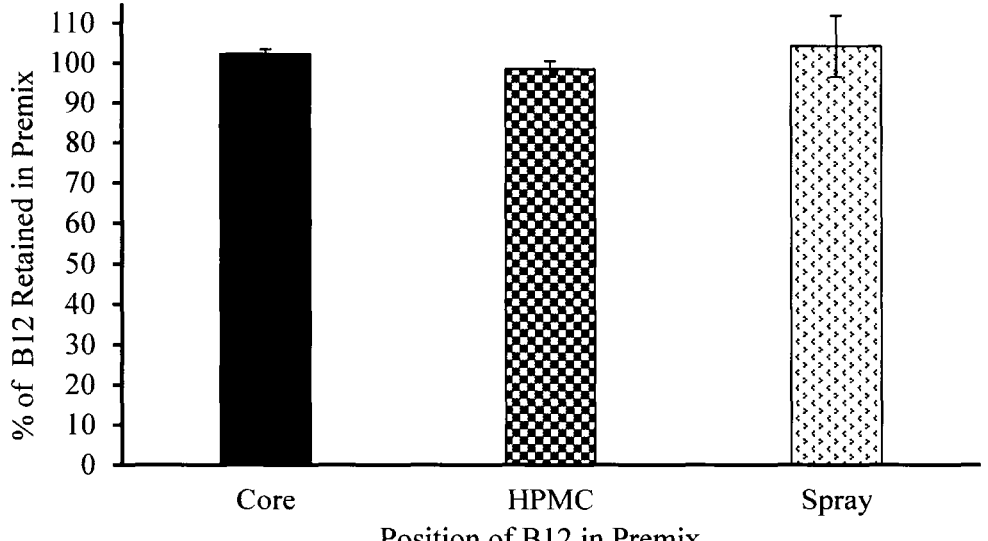
FIG. 5 is a plot showing the stability of vitamin B12 in a multi-supplement food-additive particle (premix) after 6 months of storage at 25 degrees C.

Vitamin B12 was compatible with iron in the iron-B12 premix. When stored at room temperature, over 97% of the B12 was retained in the iron-B12 premix made with the three approaches (coextrusion with iron (core), sprayed on extrudate before colour masking (spray) and addition to HPMC (HPMC)) after six months of storage (FIG. 5). The pH of the iron-B12 premix (4.7-5.0) was optimal for the stability of vitamin B12.

Figure 7:
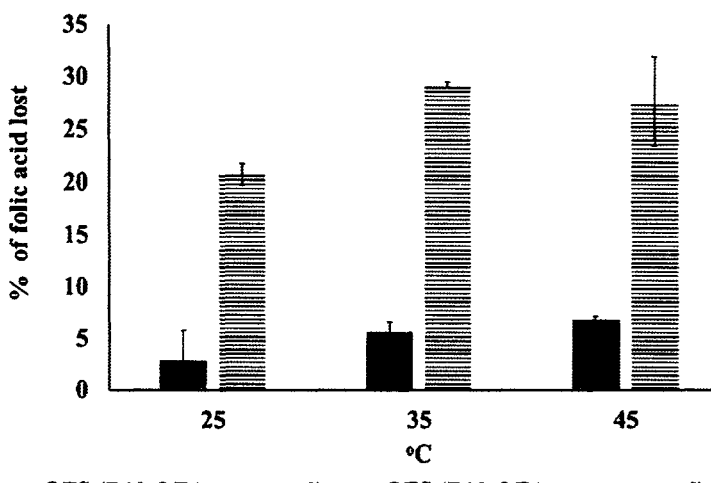
FIG. 7 is a series of plots showing the impact of vitamin B12 on the stability of iodine and folic acid in quadruple fortified salt after six months of storage.
Figure 7:
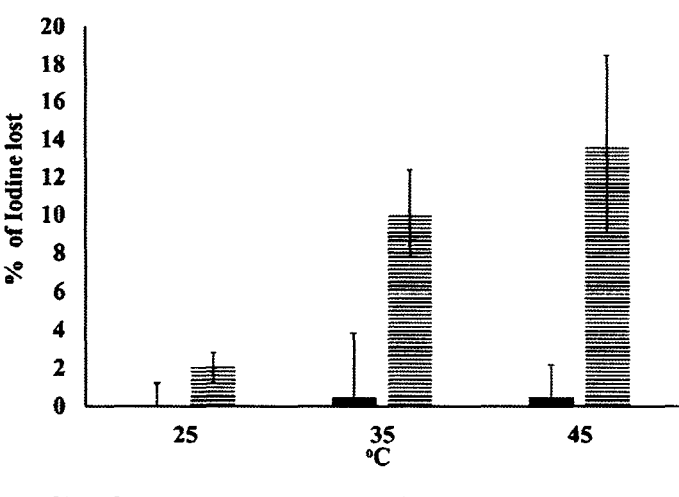
Figure 8:
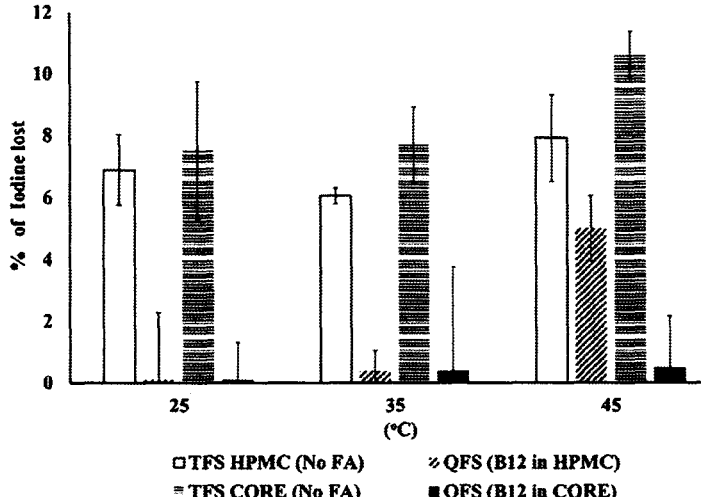
FIG. 8 is a series of plots showing the impact of folic acid on iodine stability and the impact of iodine on folic acid stability in fortified salt after six months of storage.
Figure 8:
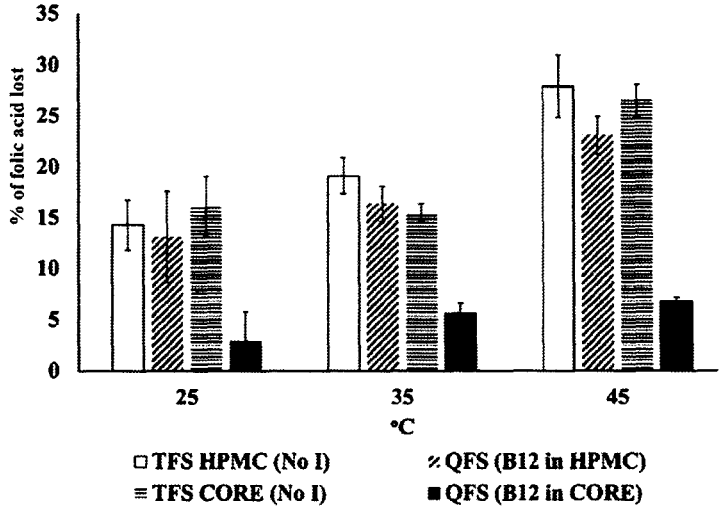

Quadruple fortified salt was formulated with the three iron-B12 premixes. Folic acid and iodine were added as a solution sprayed onto salt. The quadruple fortified salt contained 1000 microgram/gram iron, 50 microgram/gram iodine, 25 microgram/gram folic acid and 0.25 microgram/gram vitamin B12. It was assumed that since the vitamin B12 was very stable in the premix, it would be stable in the salt. Hence only folic acid and iodine were regularly analyzed. In all cases, 74-97% of folic acid and 85-100% of iodine were retained in the quadruple fortified salt after 6 months storage at 25, 35 and 45 degrees C. and at 60-70% RH (FIGS. 6-8).

Figure 6:
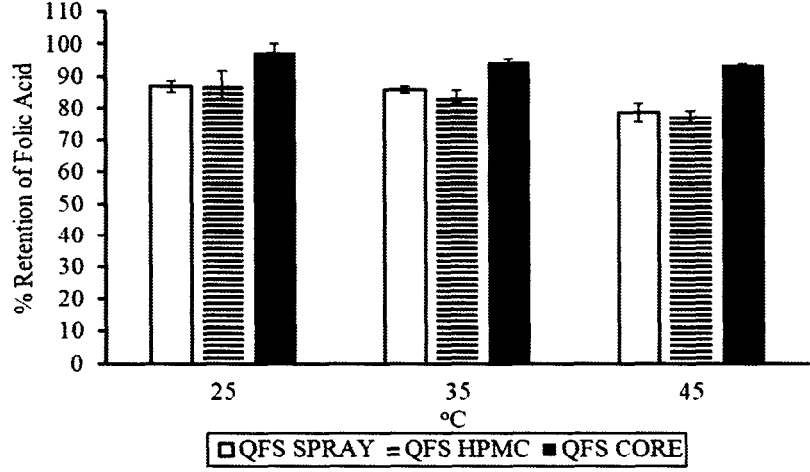
FIG. 6 is a series of plots showing the stability of iodine and folic acid in quadruple fortified salt formulated with different premix samples after six months of storage.
Figure 6:
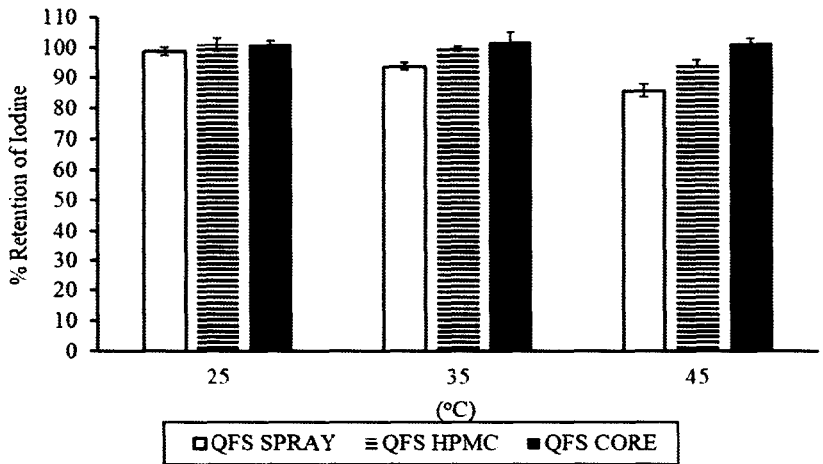

The point of addition of vitamin B12 did not impact the stability of iodine at room temperature, but at 45 degrees C., the stability of iodine was significantly higher in salt formulated with the premix that had B12 in the core (FIG. 6). At this temperature (45 degrees C.), vitamin B12 being in the core of the premix improved the stability of iodine by 6-15% when compared with when vitamin B12 was in other parts in the premix. A similar trend was observed for folic acid; however folic acid was significantly more stable in QFS formulated with the B12 in the core at all the temperatures. Folic acid stability was improved by 11-15% when vitamin B12 was in the core relative to vitamin B12 being in other parts of the premix (FIG. 6).

The coextrusion of vitamin B12 and iron may have several unexpected advantages. Firstly, it can be a simple technique for making QFS. Secondly, it can result in the physical separation of incompatible fortificants. This can allow for the potency of the fortificants to be maintained, and for their stability to be enhanced (FIG. 6). Thirdly, the encapsulation of the extrudate may facilitate the acceptability of the resultant salt, since the pink colour of the vitamin B12 is eliminated by the colour masking and encapsulation of the premix. Also, the coatings can protect the vitamin B12 from photodegradation. Finally, this technology may be incorporated into existing infrastructure for fortified salt production.

The higher stability of folic acid and iodine observed in QFS formulated with the iron and vitamin B12 in the core of the premix suggests that vitamin B12 degrades iodine and folic acid in the salt. To corroborate that vitamin B12 may have negatively impacted the stability of folic acid and iodine in QFS, the stability of iodine and folic acid in two QFS samples (in one, vitamin B12 was in contact with iodine and folic acid and in the other, vitamin B12 was physically separated from folic acid and iodine) was compared. The results showed that physical separation of vitamin B12 from iodine and folic acid in QFS improved the stability of folic acid and iodine in QFS (FIG. 7). This shows an additional unexpected advantage for the coextrusion of iron and vitamin B12. About 10-20% loss of folic acid and iodine can be associated with the vitamin B12 interaction with iodine and folic acid in QFS. This suggests that the vitamin B12 interaction with iodine and folic acid tripled and in some cases quadrupled folic acid and iodine loss in salt.

Folic acid and iodine were observed to be mutually stabilizing in QFS (FIG. 8). However, these results show that Iodine, Iron, and vitamin B12 can be simultaneously delivered without folic acid, for example where there is a population that has an overload of folic acid but a deficiency of vitamin B12.

Example 2

Materials & Methods:

Various coatings were evaluated, in order to minimize or reduce floating of the premix particles when added to food, which can result in washing away of the premix particles as an unwanted contaminant. The premix was coated with different combinations of coating materials (Table 3). A floating test was carried out on the various coated premix samples. For each sample, 30 particles were counted and poured into 1000 mL of boiling water. The number of particles still floating after 5 minutes was counted. The kinetics of iron release from the premix samples at pH 1 was evaluated.

TABLE 3

| Coating materials used to evaluate floating of the premix | | | |
|---|---|---|---|
| Premix | HPMC (% w/w) | Soy Stearin (% w/w) | Lecithin (% w/w) |
| A | 10 | 0 | 0 |
| B | 0 | 10 | 0 |
| C | 5 | 5 | 0 |
| D | 0 | 10 | 10 |

Results:

About 8% of the premix coated with soy stearin alone floated after dropping into boiling water for 5 minutes; about 1% of the premix coated with HPMC floated after dropping into boiling water for 5 minutes; and 0% of the premix coated with soy stearin and lecithin floated after dropping into boiling water for 5 minutes (Table 4). It is believed that the hydrophobicity of soy stearin is the cause of the floating. It seems that the fat on the premix, when coated with 5% w/w soy stearin, melted quickly within the 5 minutes, while the thicker layer of fat in those coated with 10% w/w, did not. Hence, premix coated with 5% w/w HPMC and 5% w/w soy stearin behaves as the premix coated with 10 w/w HPMC. The presence of lecithin, an emulsifier, immediately wets the surface of the premix and they all sank into the boiling water just as they were dropped into it.

TABLE 4

| Percentage of premix that floated in boiling water after 5 minutes | |
|---|---|
| Premix Coating | Premix that floated (%) |
| 10% w/w HPMC | 0.8 |
| 10% w/w Soy stearin | 7.5 |
| 5% w/w HPMC & 5% w/w Soy Stearin | 0.8 |
| 10% w/w Soy Stearin & 10% w/w Lecithin | 0 |

Example 3

Materials & Methods:

The amount of $TiO_2$ used for color masking was evaluated, as shown in Table 5. Both a fluidized bed and pan coating were evaluated. Pan coating mimics drum coating, which is typically used for coating on an industrial scale. Various percentages of $TiO_2$ were evaluated with pan coating: 5, 10, 15 and 20% $TiO_2$. The whiteness of the premix was evaluated using L*a*b* analysis and compared with the premix color masked with 12.5 and 25% $TiO_2$ and HPMC coated with the fluidized bed.

TABLE 5

| Different percentages of $TiO_2$ used to color mask the core particle, and methods used to apply coating materials | | |
|---|---|---|
| Premix Samples | $TiO_2$ (%) | Method |
| A | 25 | Fluidized bed for HPMC and pan coating for soy stearin |
| B | 12.5 | Fluidized bed for HPMC and pan coating for soy stearin |
| C | 5 | Pan coating for HPMC & soy stearin |
| D | 10 | Pan coating for HPMC & soy stearin |
| E | 15 | Pan coating for HPMC & soy stearin |
| F | 20 | Pan coating for HPMC & soy stearin |

Results:

The L*a*b analysis showed that using more $TiO_2$ gives a whiter premix when a pan coater is used to apply HPMC; however, the additional whiteness (L*) significantly decreased when the amount of $TiO_2$ used was increased from 15% to 20% (Table 6). There was minimal difference in the whiteness of premix color-masked with 12.5 and 25% $TiO_2$ when the fluidized bed was used to apply the HPMC (a step after color masking). About half of the $TiO_2$ (25%) used to color-mask the extrudate was blown away in the fluidized bed (Table 6). This suggests that a fluidized bed is not an optimal model for formulating the amount of $TiO_2$ to be used for drum coating, and the use of pan coater is a better model than the fluidized bed for applying HPMC. Based on these results, the use of 15% $TiO_2$ may be preferred for colour masking, and a staggered model may be preferred for applying the $TiO_2$ and the HPMC (5% of $TiO_2$ applied 3 times intermittently with HPMC).

TABLE 6

| Colour analysis of extrudate coated with a varying amount of $TiO_2$ | | | |
|---|---|---|---|
| % of $TiO_2$ (method used for applying HPMC) | L* | a* | b* |
| 25 (Fluidized bed) | 75.52 | 0.65 | −1.31 |
| 12.5 (Fluidized bed) | 75.49 | 0.65 | −1.19 |
| 5 (Pan coater) | 73.28 | 0.46 | −1.39 |
| 10 (Pan coater) | 80.87 | −0.21 | −1.49 |
| 15 (Pan coater) | 86.34 | −0.38 | −1.42 |
| 20 (Pan coater) | 88.88 | −0.45 | −0.73 |

Example 4

Figure 9:
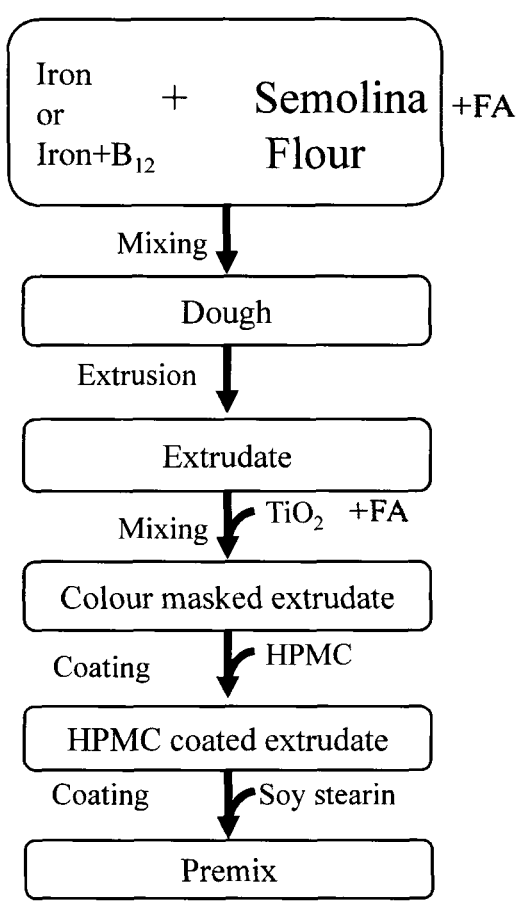
FIG. 9 is a flow diagram showing an example process for making a multi-supplement food-additive (premix), in which example points for incorporating folic acid (FA) into the premix are indicated.

Materials & Methods:

In Example 1, a solution containing folic acid and iodine was sprayed on salt, while adding vitamin B12 and an iron micronutrient as a separate particle. While this example was successful, it was observed that the addition of folic acid by spraying can impact the colour of the salt (i.e. a yellow color is observed), which may impact the acceptance of the salt. Accordingly, the inclusion of the folic acid in the premix was evaluated. Four types of premix were made for this purpose, as shown in FIG. 9, in which "FA" indicates the location of addition of folic acid: Two of the premix samples contained an iron micronutrient and folic acid; in one of these two, folic acid was separated from the iron micronutrient by a layer of $TiO_2$, and in the other, the iron micronutrient and folic acid were in the core of the premix. The two other premix samples contained an iron micronutrient, folic acid, and vitamin B12; in one of these two, all of the micronutrients were in the core of the premix, while in the other, folic acid was separated from the iron micronutrient and vitamin B12 by a layer of $TiO_2$. As shown in FIG. 9, folic acid was separated from other micronutrients by spraying a mixture of folic acid, HPMC, dichloromethane and ethanol on the extrudates that contained the other micronutrients and which have been coated with $TiO_2$.

Results:

In triple and quadruple fortified salts in which the salt was formulated by spraying iodine and folic acid on salt and adding iron and B12 as a premix, the salt had a yellow color due to the folic acid (Table 7), which may affect the acceptance of the salt.

TABLE 7

| Impact of folic acid on the colour of the salt | | | |
|---|---|---|---|
| Concentration of folic acid in salt (microgram/gram) | L* | a* | b* |
| 0 | 98.61 | −0.02 | 1.16 |
| 12.5 | 95.43 | −1.53 | 8.44 |
| 25 | 94.27 | −2.92 | 13.50 |

In order to address the yellow color of the salt, the folic acid was encapsulated in the premix particle. The colour of the salt was then nearly identical to that of unfortified salt (results of L*a*b*analysis were the same as shown in Table 7 for 0 microgram/gram folic acid).

Example 5

Materials & Methods:

An accelerated kinetic study was conducted to evaluate the stability of the micronutrients in the premixes and solution. The stability of folic acid and iodine in the spray solution was evaluated, and the stability of B12 in the various premixes was evaluated. The solution and premix were stored at 50, 60, 70 and 80 degrees C. for 7 days. For the solution, samples (250 mL) were stored in 400 mL Fisherbrand Glass Bottles. About 1 mL of the samples were collected from the bottles at days 1, 3, 5 and 7, and stored at −20 degrees C. before analysis. For the premix, 1 g was weighed into aluminium weighing dishes. At days 1, 3, 5 and 7, samples were pulverized in a mortar and pestle. Vitamin B12 was extracted with 0.1 M $Na_2CO_3$. The crude extract was filtered (0.45 um) and stored at −20 degrees C. before analysis.

Figure 10:
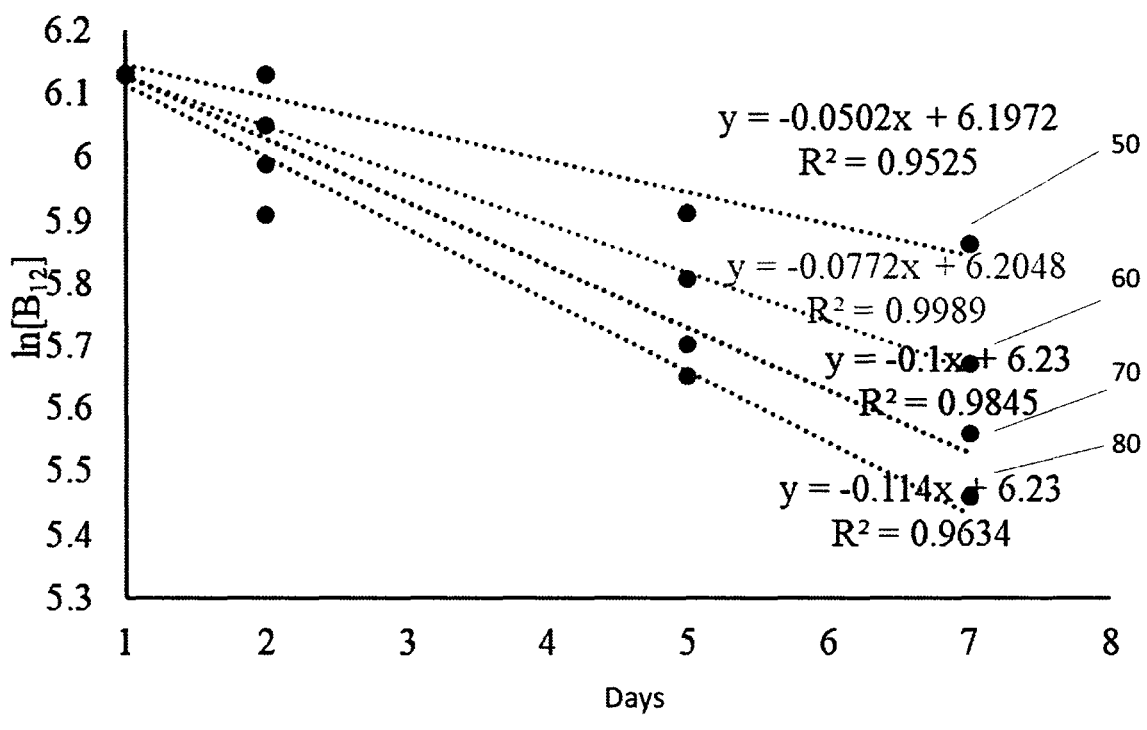
FIG. 10 is a plot showing the degradation kinetics of vitamin B12 in a premix that has iron, folic acid and B12 coextruded.
Figure 11:
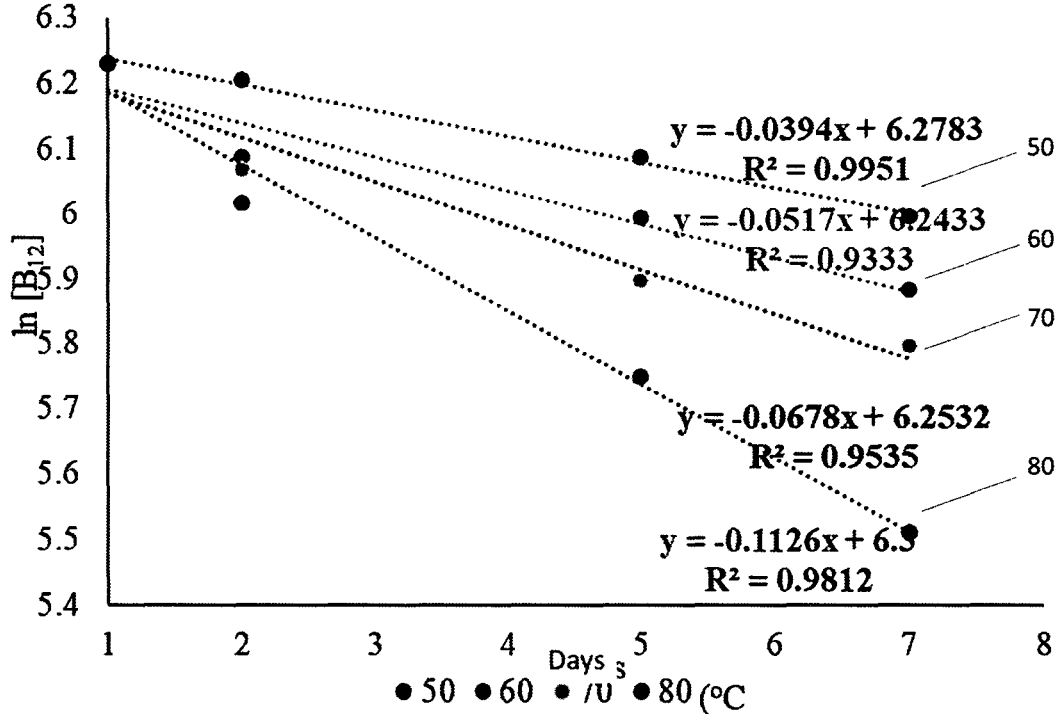
FIG. 11 is a plot showing the degradation kinetics of vitamin B12 in a premix that has folic acid separated from iron and vitamin B12 by a layer of $TiO_2$.

Results:

The plot of the data obtained from the accelerated stability study of B12 in the premix samples followed a first order rate law. The rate constant for degradation of B12 in the premix that has all of the micronutrients (i.e. iron, B12, and folic acid) in the core is 0.0502 day$^{-1}$, 0.0772 day$^{-1}$, 0.100 day$^{-1}$, and 0.114 day$^{-1}$ for 50 degrees C., 60 degrees C., 70 degrees C. and 80 degrees C. respectively (FIG. 10). The rate constant for degradation of B12 in the premix that had folic acid and B12 separated by a layer of $TiO_2$ is 0.0394 day$^{-1}$, 0.0517 day$^{-1}$, 0.0678 day$^{-1}$, and 0.1126 day$^{-1}$ for 50 degrees C., 60 degrees C., 70 degrees C. and 80 degrees C. respectively (FIG. 11). However, soy stearin used as the final coat for the premix melts at about 75 degrees C.; the Arrhenius plot (FIG. 12) for the kinetic data ignores 80 degrees C.

Figure 12:
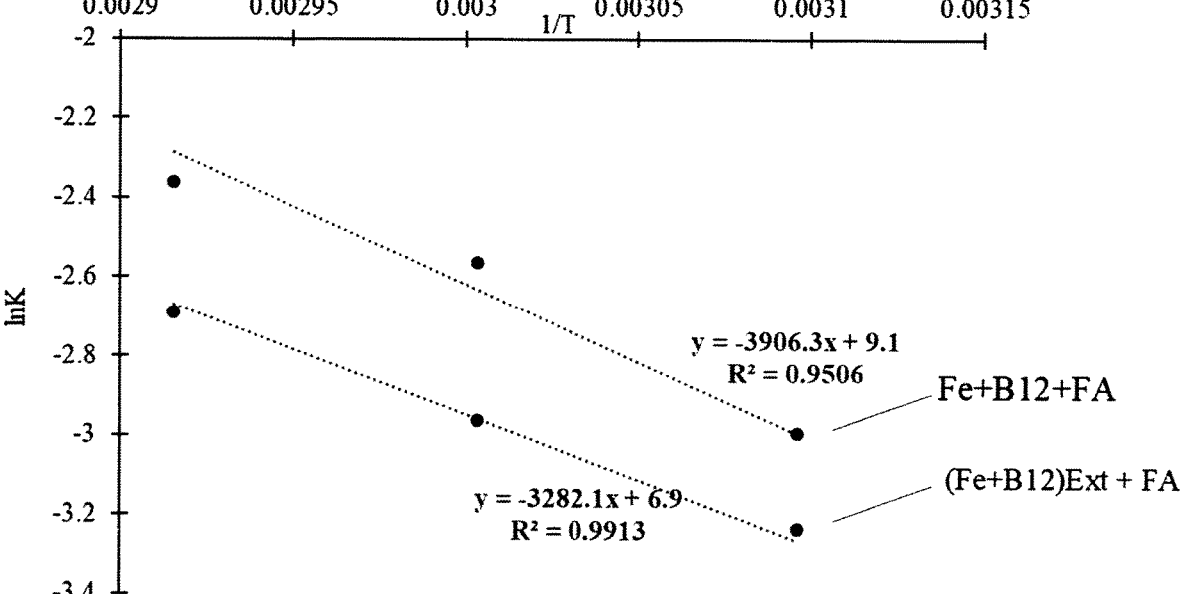
FIG. 12 is an Arrhenius plot for the degradation of vitamin B12 in various premixes.

FIG. 12 is an Arrhenius equation plot, ($lnK \propto 1/T$) for the kinetic of degradation of B12 in the premix samples. The slope of the plot is as follows:

$$Slope=[Ea]_B12/R.$$

$$R=8.314\ 4621(75).\ JK^{-1}\ mol^{-1}$$

$$[Ea]_B12=Slope \times R(J)$$

The activation of energy for degradation of B12 in the two premix samples is 27.29 kJ/mol and 32.48 kJ/mol; the higher activation energy is observed in the premix that has the B12 and folic acid together in the core of the premix. This result suggests that including the micronutrients in the core of the premix may be preferred.

Figure 13:
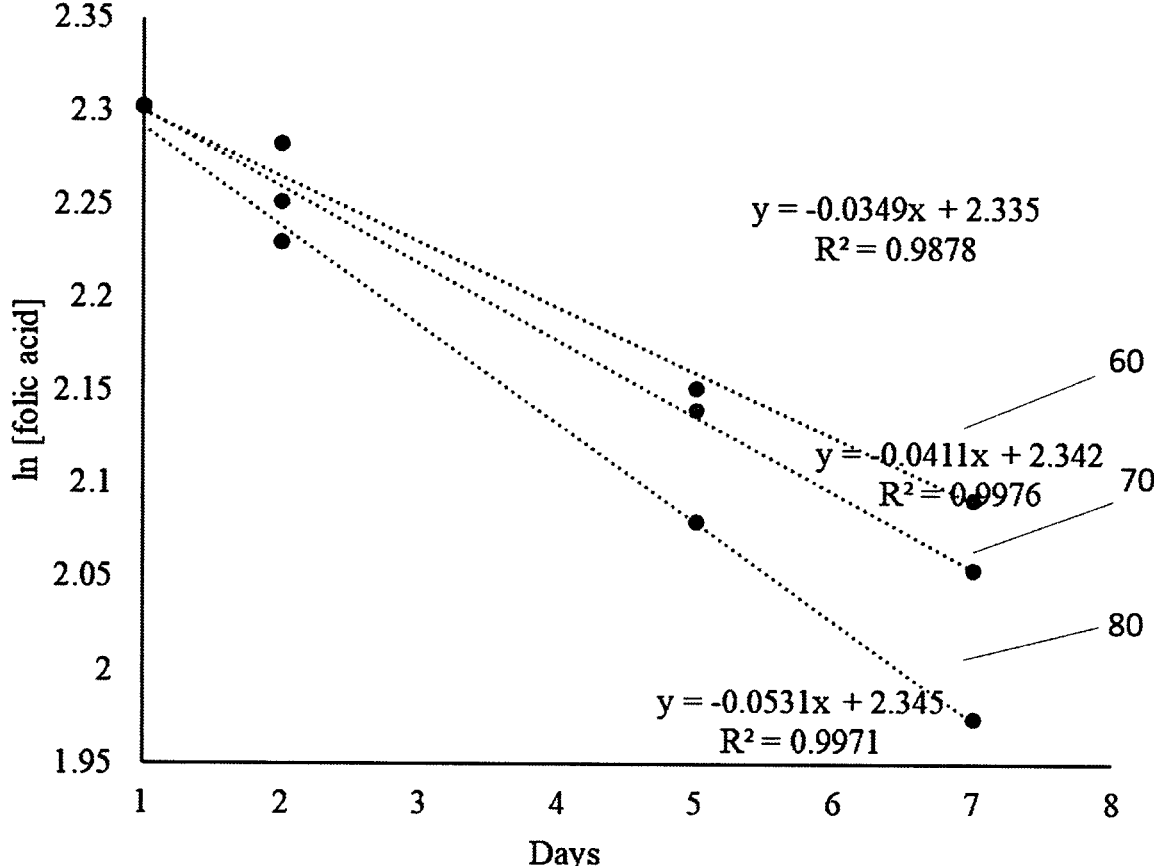
FIG. 13 is a plot showing the first order degradation of folic acid in a spray solution.
Figure 14:
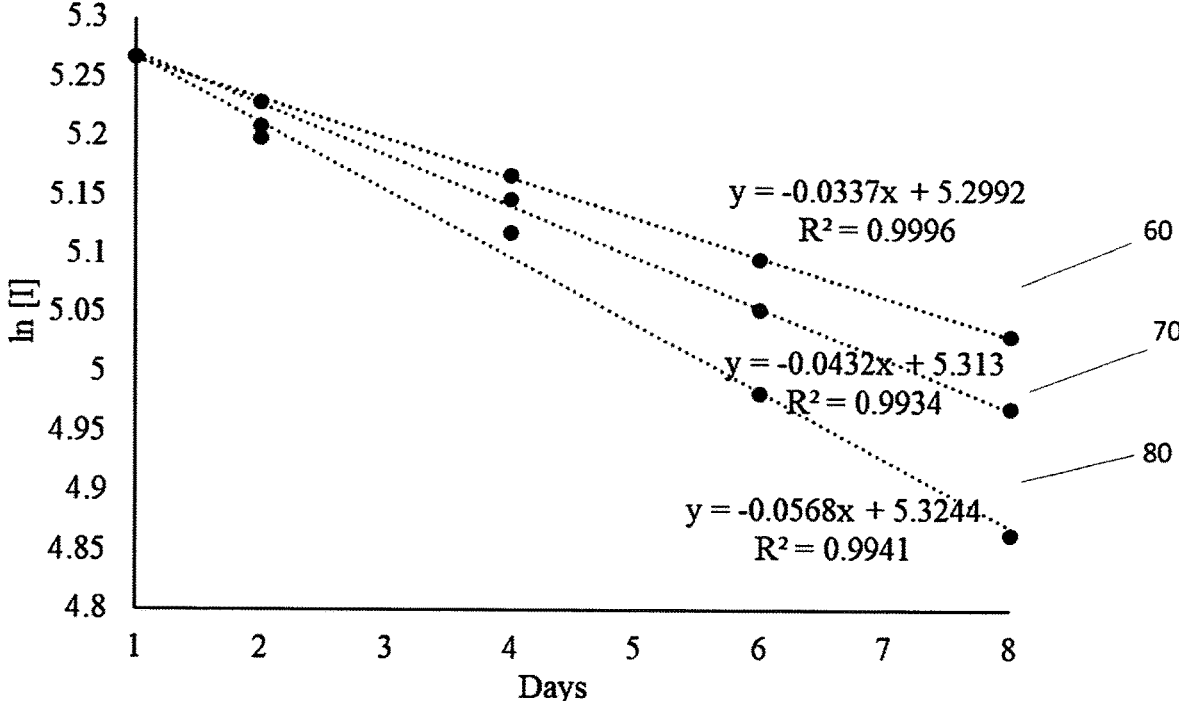
FIG. 14 is a plot showing the first order degradation of iodine in a spray solution.
Figure 15:
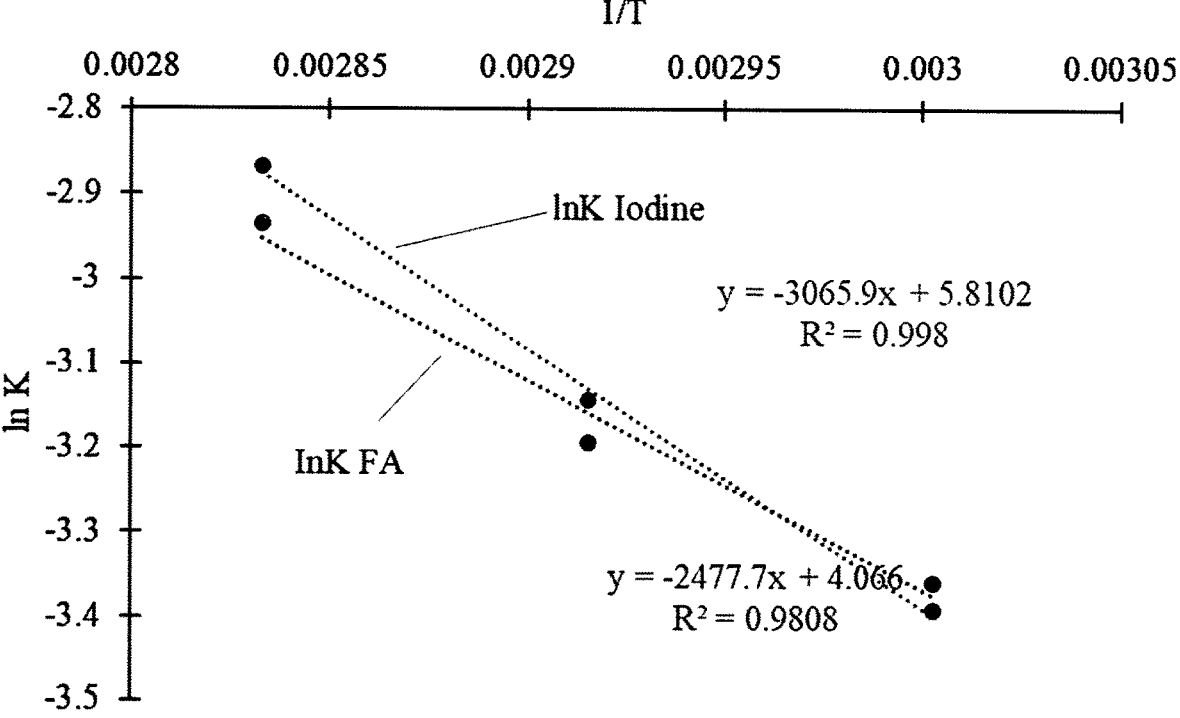
FIG. 15 is an Arrhenius plot for the degradation of folic acid and iodine in a spray solution.

Although encapsulation of the folic acid in the premix particle may be preferred, spraying folic acid and iodine as a solution on salt may still be carried out, and thus the degradation of folic acid and iodine in spray solution was studied. The kinetics of degradation of folic acid and iodine in spray solution followed first order kinetics (FIGS. 13 to 15). The degradation constants of folic acid were 0.0349 day$^{-1}$, 0.0411 day$^{-1}$, and 0.0531 day$^{-1}$, while those of iodine were 0.0337 day$^{-1}$, 0.0432 day$^{-1}$, and 0.0568 day$^{-1}$ at 60 degrees C., 70 degrees C. and 80 degrees C. respectively. The Arrhenius plot of the kinetics showed that activation energies for the degradation of folic acid and iodine in the solution were 20.60 kJ/mol and 25.49 kJ/mol respectively. The degradation constant and activation energy showed that iodine is comparatively more stable than folic acid in the solution. After 2 months of storage, about 90% of iodine and 80% of folic acid were retained.

Example 6

Materials & Methods

The effect of boiling on the stability of folic acid and vitamin B12 was assessed, in order to mimic food preparation. A known amount of folic acid (0.5 g) was weighed into 250 ml of boiling water. Boiling was continued for 30 minutes. At 1, 5, 10, 15, 20, 25, and 30 minutes, the solution was made up to 250 ml, and then 1 ml of the solution was measured out into a centrifuge vial. The same procedure was followed for B12.

Figure 16:
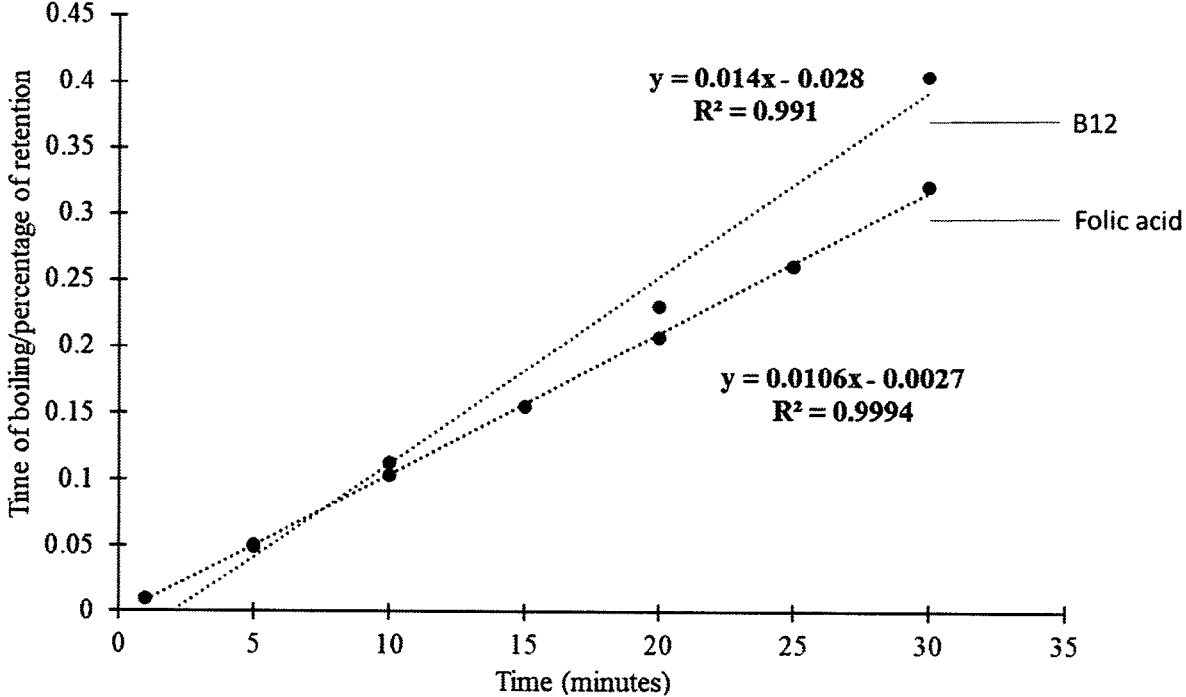
FIG. 16 is a plot showing pseudo-second order degradation kinetics of folic acid and vitamin B12.

Results:

About 93% of the folic acid and 75% of B12 added was retained after boiling for 30 minutes. This shows that folic acid is very stable in boiling and comparatively more stable than vitamin B12. As shown in FIG. 16, the kinetics of degradation of folic acid and B12 in boiling fit better into the pseudo-second order reaction kinetics: [Folic acid/B12]/t$\propto$t.

Example 7

Materials & Methods:

The kinetics of iron released from all premix samples at pH 1 was evaluated. This was a bioaccessibility study of iron from the premix since the pH of the gastric juice is about 1.

Figure 17:
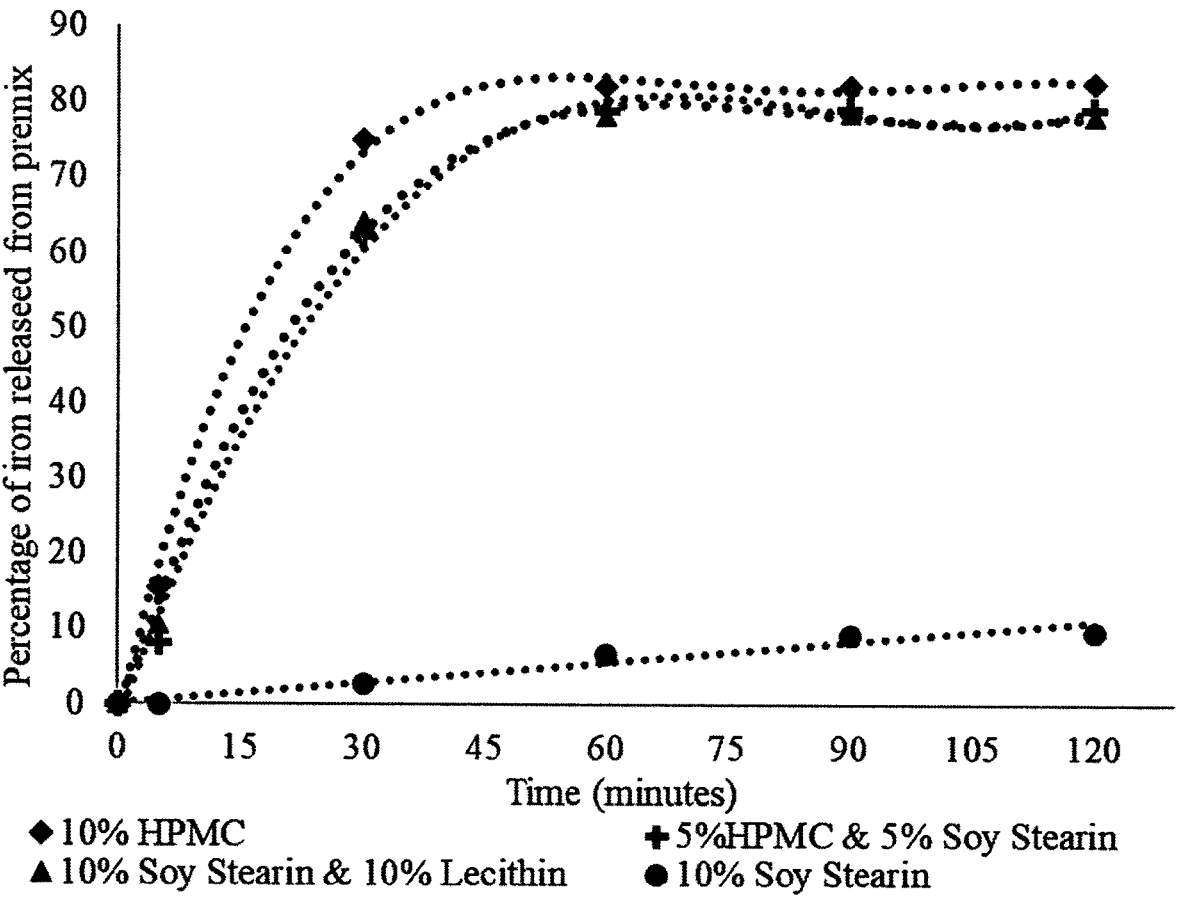
FIG. 17 is a plot showing the kinetics of iron release in various premix samples at pH 1.

Results:

While the release of iron in the premix coated with 10% soy stearin follows zero-order kinetics, others followed a different pattern: the first 30 minutes was zero-order, then second-order until 60 minutes, when a steady state was reached. For zero-order, the release of iron from the premix was independent of the concentration of the iron dissolved in the solvent; for first order, the release was dependent on the concentration of the dissolved iron. The maximum amount of iron (78-82%) were already released at 60 min for all premix samples except the one coated with 10% soy stearin which had 10% of its iron released (FIG. 17). The significant difference among the percentages of iron released from the premix is believed to be due to the presence of soy stearin, which is believed to have prevented the release of iron. The release kinetics of iron from the premix coated with 5% HPMC & 5% soy stearin, and 10% soy stearin & 10% lecithin followed the same pattern. It is believed that the lecithin within the soy stearin matrix allowed the solution to gain access to the core of the premix faster than when it was coated with only soy stearin.

Figure 18:
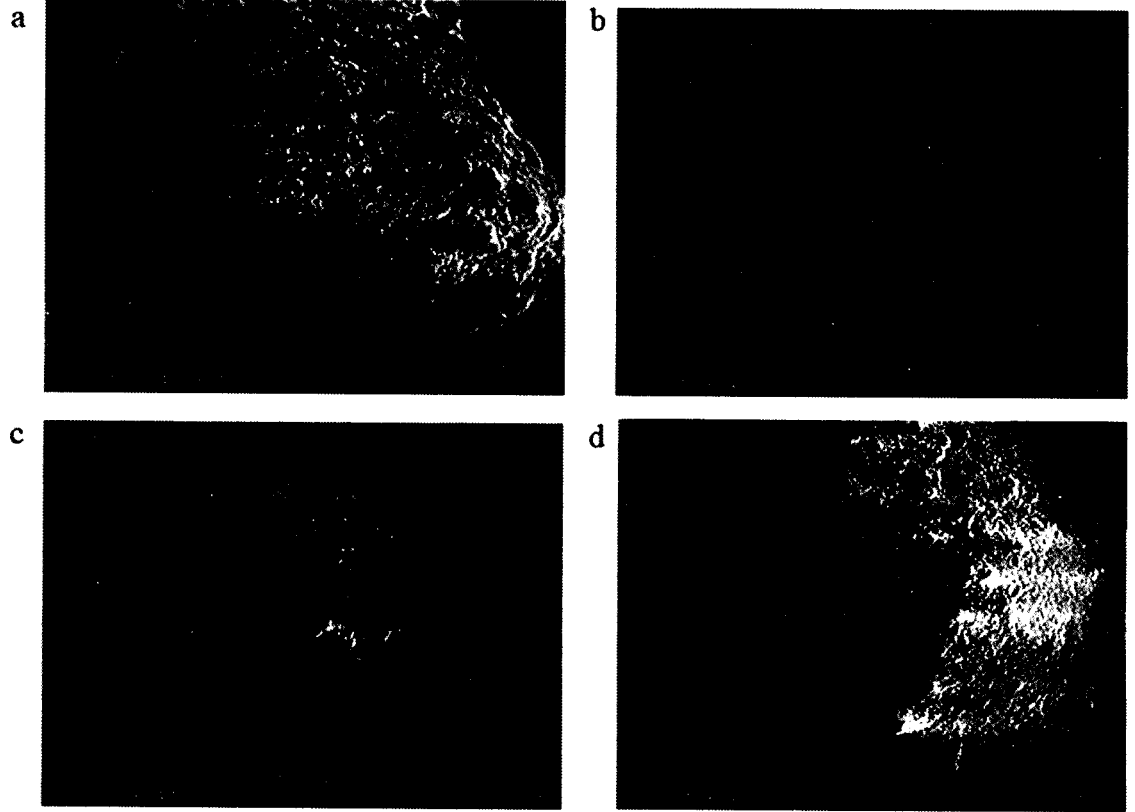
FIG. 18 shows scanning electron microscope images of various premixes, as follows: a) coated with 10% HPMC b) coated with 10% soy stearin and 10% lecithin c) coated with 10% soy stearin and d) coated with 5% HPMC and 5% soy stearin.

Although it was observed that soy stearin imparted a smoother surface to the premix, minimal differences were observed in the surface morphology of the premix (FIG. 18).

In light of the above results, HPMC and soy stearin may be preferred as an encapsulating coating.

We claim:

1. A multi-supplement food-additive, comprising: particles, wherein each particle has i) a core including a first supplement and a binder, ii) a coating on the core, the coating comprising a color-masking coating on the core and an encapsulating coating on the color-masking coating; and iii) a second supplement in the coating; wherein each particle is substantially free of sodium chloride.

2. The multi-supplement food-additive of claim 1, wherein the second supplement is water-insoluble.

3. The multi-supplement food-additive of claim 2, the second supplement is in the encapsulating coating, and the encapsulating coating comprises a hard edible fat, soy stearin and/or hydroxypropyl methyl cellulose.

4. The multi-supplement food-additive of claim 1, wherein the second supplement is in the color-masking coating.

5. The multi-supplement food-additive of claim 1, wherein a mass ratio of the first supplement to the second supplement is between 10,000:1 and 20:1.

6. The multi-supplement food-additive of claim 1, wherein the first supplement is a micronutrient.

7. The multi-supplement food-additive of claim 1, wherein the first supplement is an iron micronutrient, a zinc micronutrient, or thiamine.

8. The multi-supplement food-additive of claim 1, wherein the first supplement is ferrous fumarate, ferrous sulphate, ferric sodium EDTA, ferrous gluconate, ferric chloride, electrolytic iron, or ferric pyrophosphate.

9. The multi-supplement food-additive of claim 1, wherein the second supplement is a micronutrient, a nutraceutical, or a pharmaceutical compound.

10. The multi-supplement food-additive of claim 1, wherein the second supplement is water-soluble.

11. The multi-supplement food-additive of claim 1, wherein the second supplement is vitamin B12, vitamin B1, vitamin B9, zinc, or vitamin C.

12. The multi-supplement food-additive of claim 3, wherein the encapsulating coating comprises a hard edible fat.

13. The multi-supplement food-additive of claim 3, wherein the encapsulating coating comprises soy stearin and/or hydroxypropyl methyl cellulose.

14. The multi-supplement food-additive of claim 1, further comprising a third supplement, wherein the third supplement is in the core and/or in the coating.

15. The multi-supplement food-additive of claim 14, wherein the third supplement is a micronutrient, a nutraceutical, or a pharmaceutical compound.

16. The multi-supplement food-additive of claim 14, wherein the third supplement is vitamin B12, vitamin B1, vitamin B9, or vitamin C.

17. The multi-supplement food-additive of claim 1, wherein the binder comprises a cereal-based binder.

18. The multi-supplement food-additive of claim 17, wherein the binder comprises semolina flour.

19. The multi-supplement food-additive of claim 1, wherein the multi-supplement food-additive is yielded by: i. extruding a dough of the first supplement, the second supplement, and the binder, to yield an extrudate; ii. processing the extrudate to yield core particles; and iii. coating the core particles with the color-masking and encapsulating coating to yield the multi-supplement food-additive.

* * * * *